United States Patent [19]
Ribordy et al.

[11] Patent Number: 5,323,527
[45] Date of Patent: Jun. 28, 1994

[54] METHOD AND APPARATUS FOR WINDING A CORE FOR AN ELECTROCHEMICAL CELL AND PROCESSING THEREOF

[75] Inventors: James E. Ribordy, South Beloit; Walter R. Krevald, Chicago, both of Ill.

[73] Assignee: Weiler Engineering, Inc., Arlington Heights, Ill.

[21] Appl. No.: 50,439

[22] Filed: May 10, 1993

Related U.S. Application Data

[63] Continuation-in-part of Ser. No. 611,999, Nov. 9, 1990, abandoned.

[51] Int. Cl.⁵ .............................................. H01M 2/22
[52] U.S. Cl. ..................................... 29/623.1; 29/730
[58] Field of Search ................... 29/730, 623.1, 623.3

[56] References Cited

U.S. PATENT DOCUMENTS

| | | | |
|---|---|---|---|
| 4,283,843 | 8/1981 | Hooke | 29/623.1 |
| 4,709,472 | 12/1987 | Machida et al. | 29/623 |
| 4,930,327 | 6/1990 | Aidlin et al. | 72/148 |
| 4,975,095 | 12/1990 | Strickland et al. | 29/623.1 |
| 5,045,086 | 9/1991 | Juernens | 29/623.1 |

FOREIGN PATENT DOCUMENTS 59-103282  6/1984  Japan .

*Primary Examiner*—Karl Group
*Assistant Examiner*—Chris Gallo
*Attorney, Agent, or Firm*—Olson & Hierl

[57] ABSTRACT

A method and apparatus is provided for use in the fabrication of an electrical chemical cell having a spiral wound core. An anode plate and a first separator sheet are Juxtaposed in an adjacent relationship and restrained against relative lengthwise displacement. A cathode plate is Juxtaposed with a second separator sheet in an adjacent relationship and also restrained against relative lengthwise displacement. Portions of the first and second separator sheets are overlapped and restrained against relative movement while the restrained overlapping end portions are rotated Continuously about an axis so as to wind the plates and separator sheets into a coiled core which can be inserted into an electrochemical cell casing. The apparatus includes a vacuum holding member for holding the anode plate and first separator sheet together, and includes a vacuum holding member for holding the cathode place and second separator sheet together. A pair of rotatable clamping mandrels grip the overlapping end portions of the separator sheets and rotate to wind the sheets and the plates into the coiled core configuration. Guide members are provided adjacent the clamping mandrels to prevent the plates and separator sheets from being swung outwardly during the coil forming process. Mechanisms are also provided for inserting the coiled core into the cell casing.

35 Claims, 9 Drawing Sheets

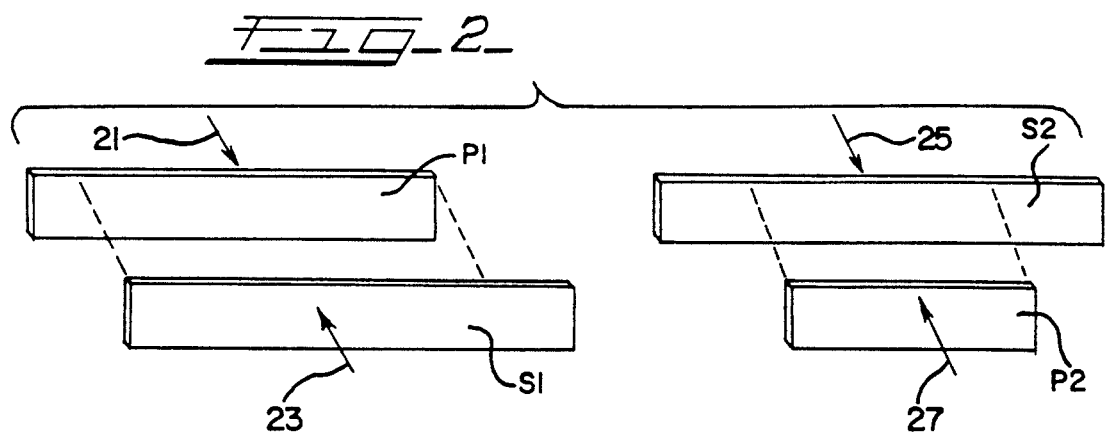
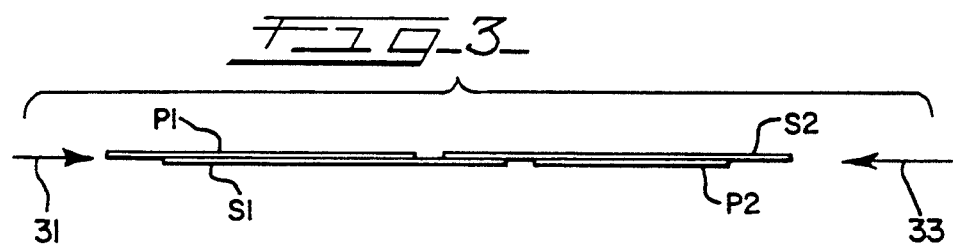
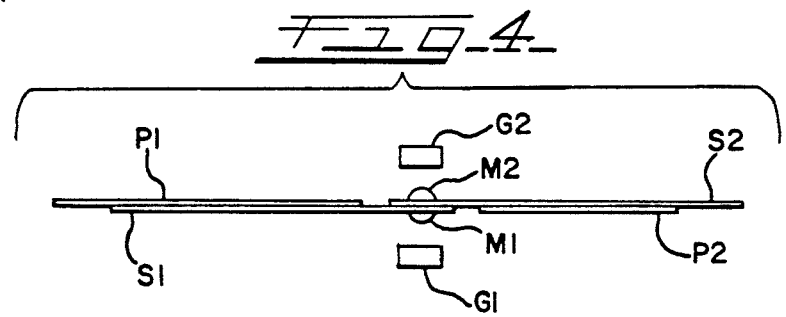
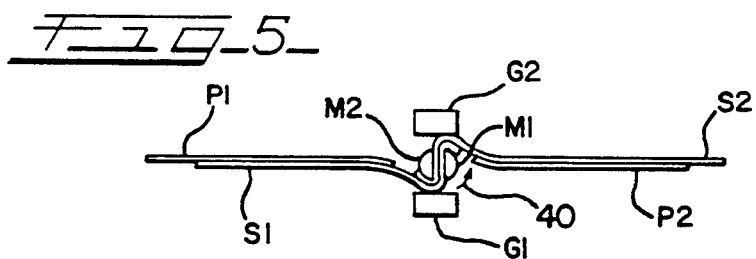
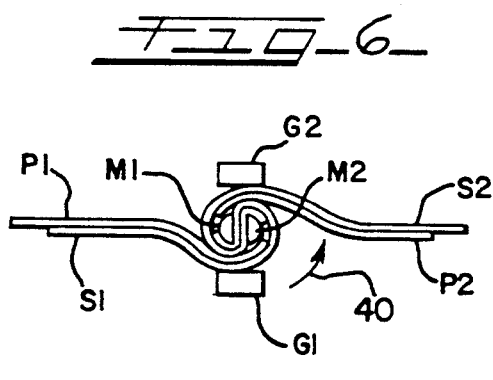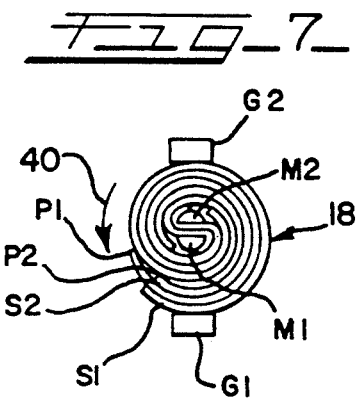

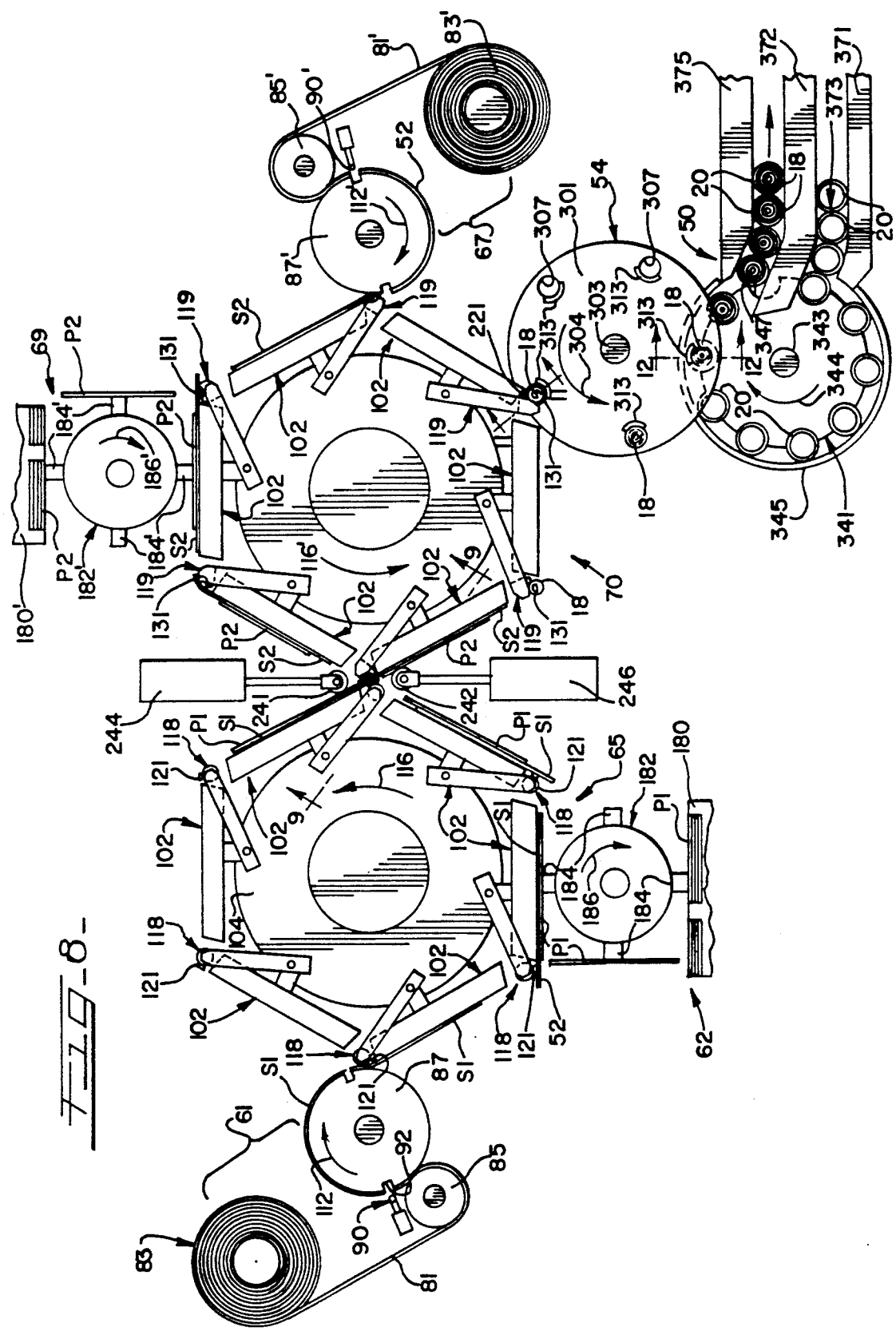

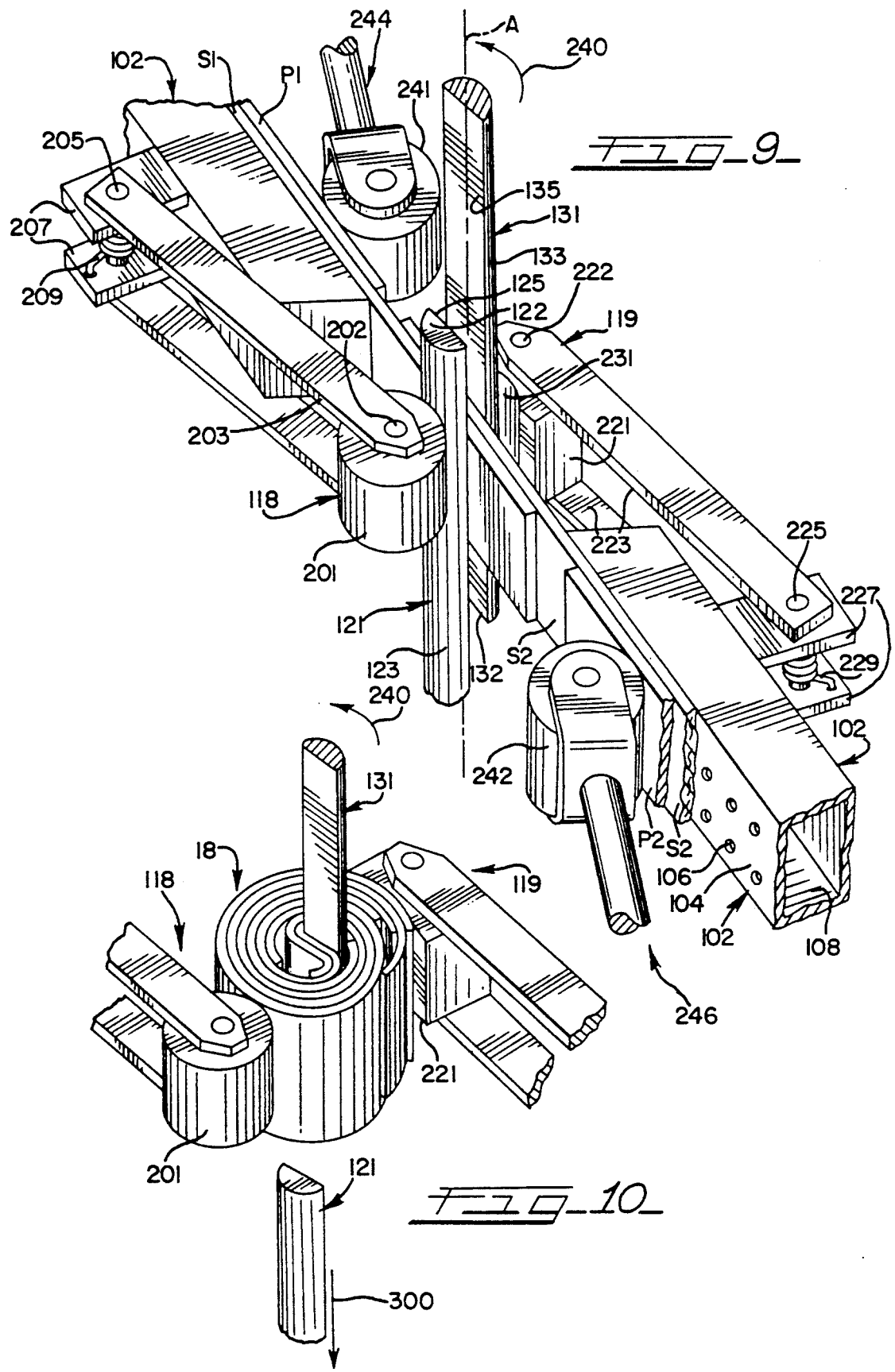

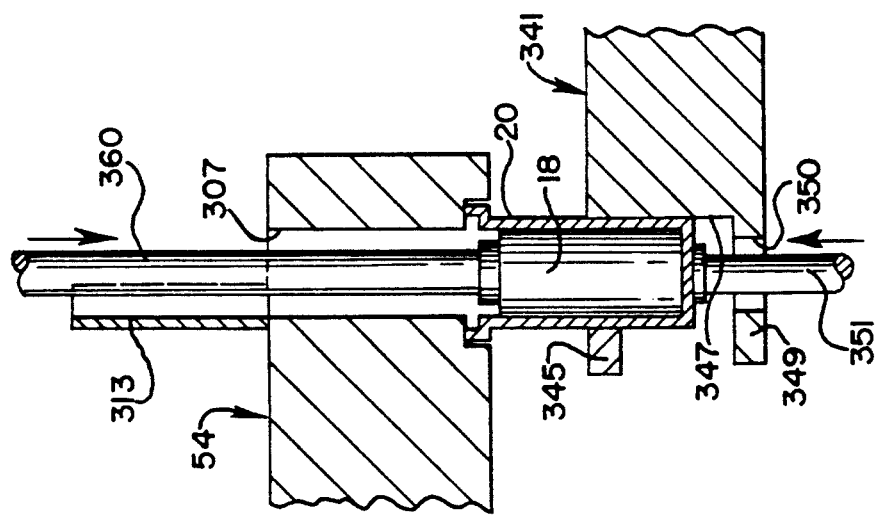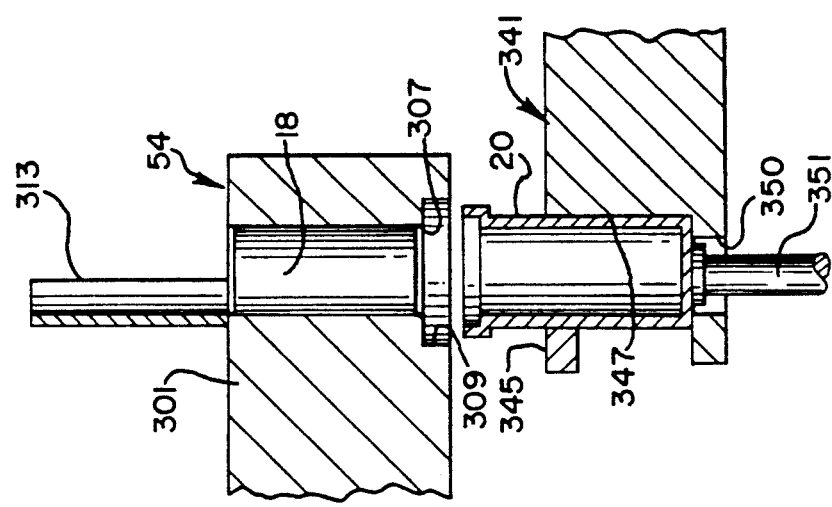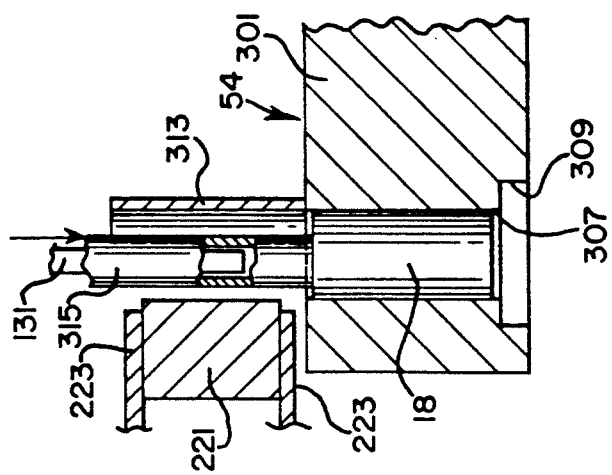

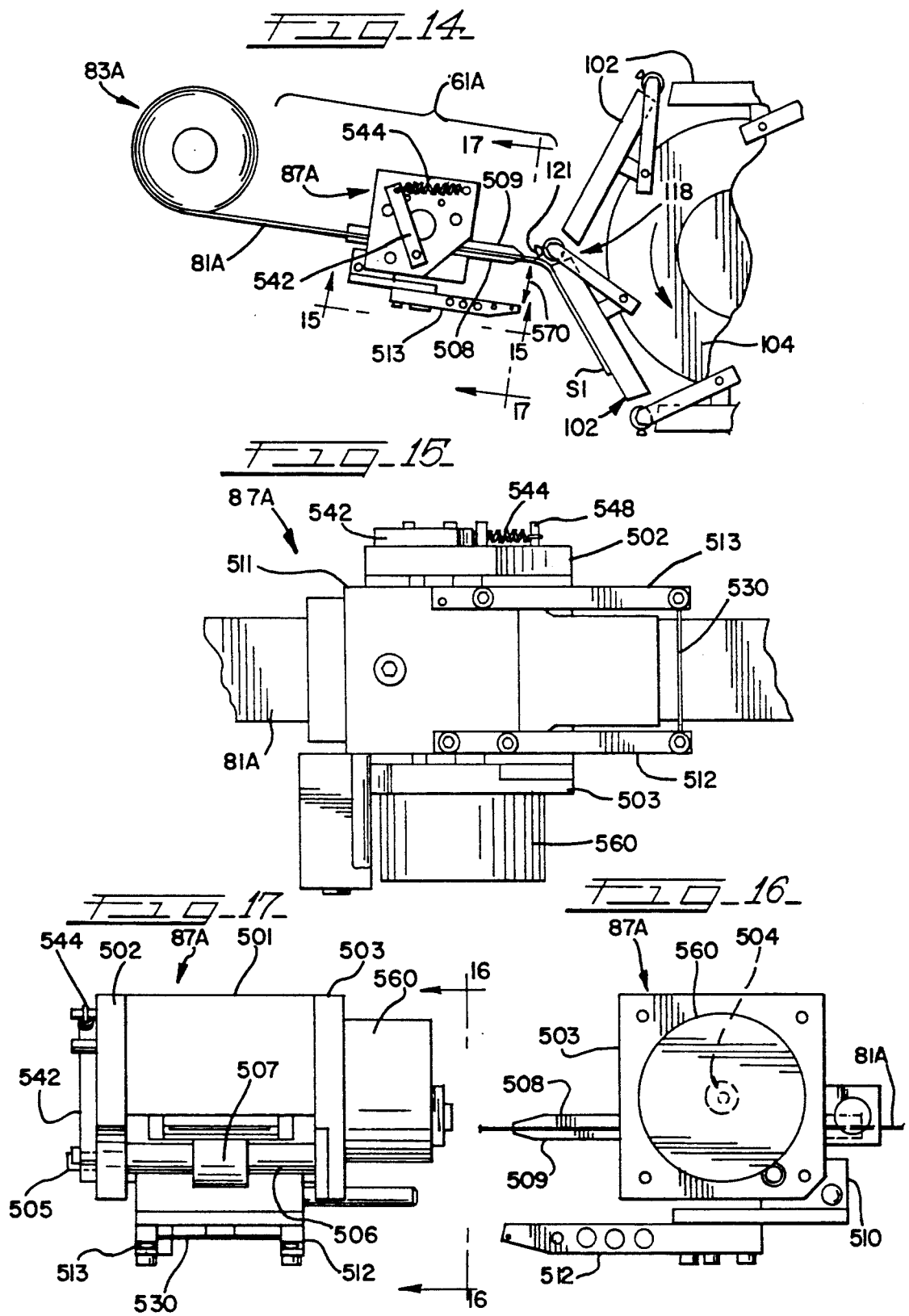

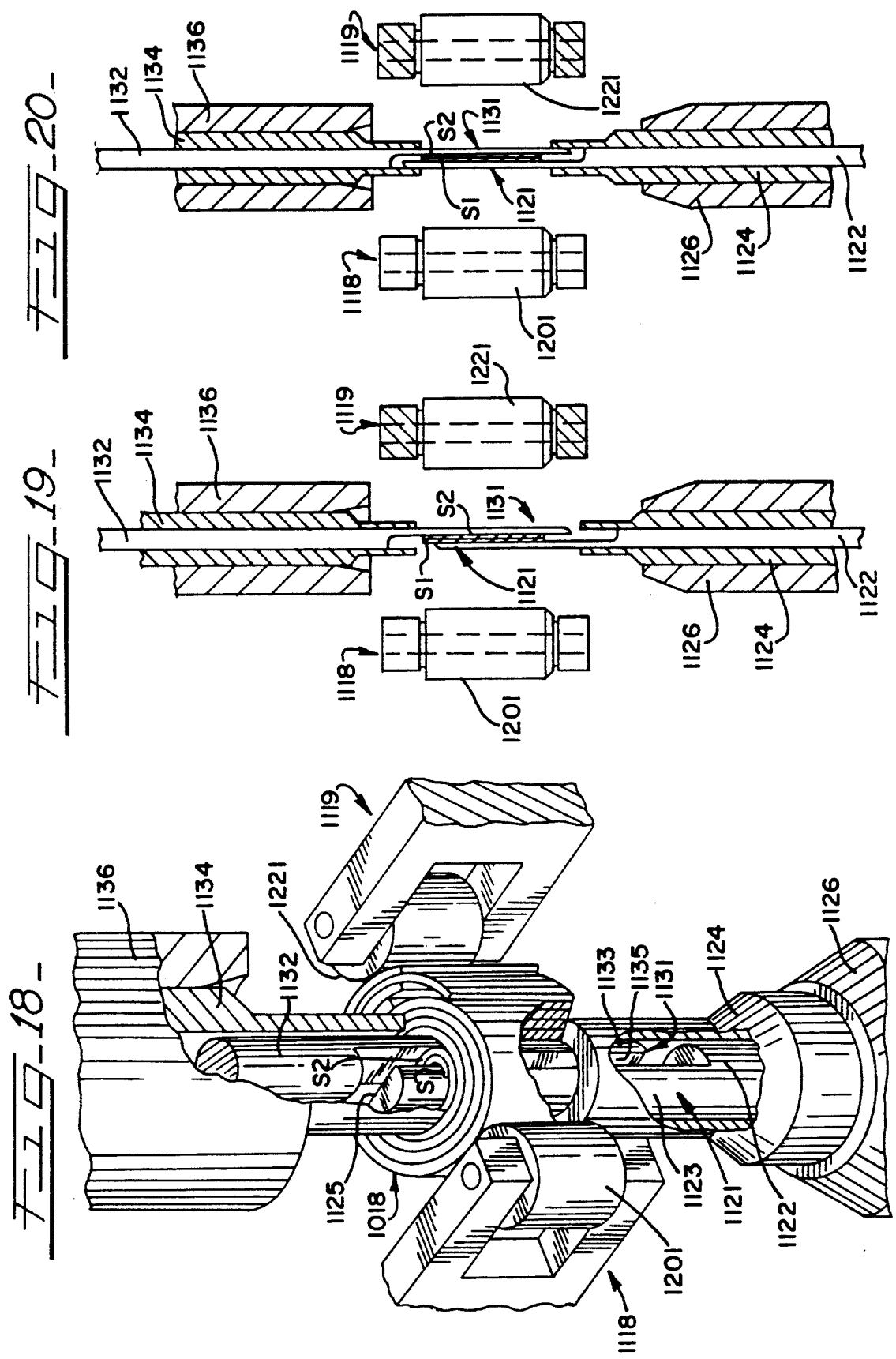

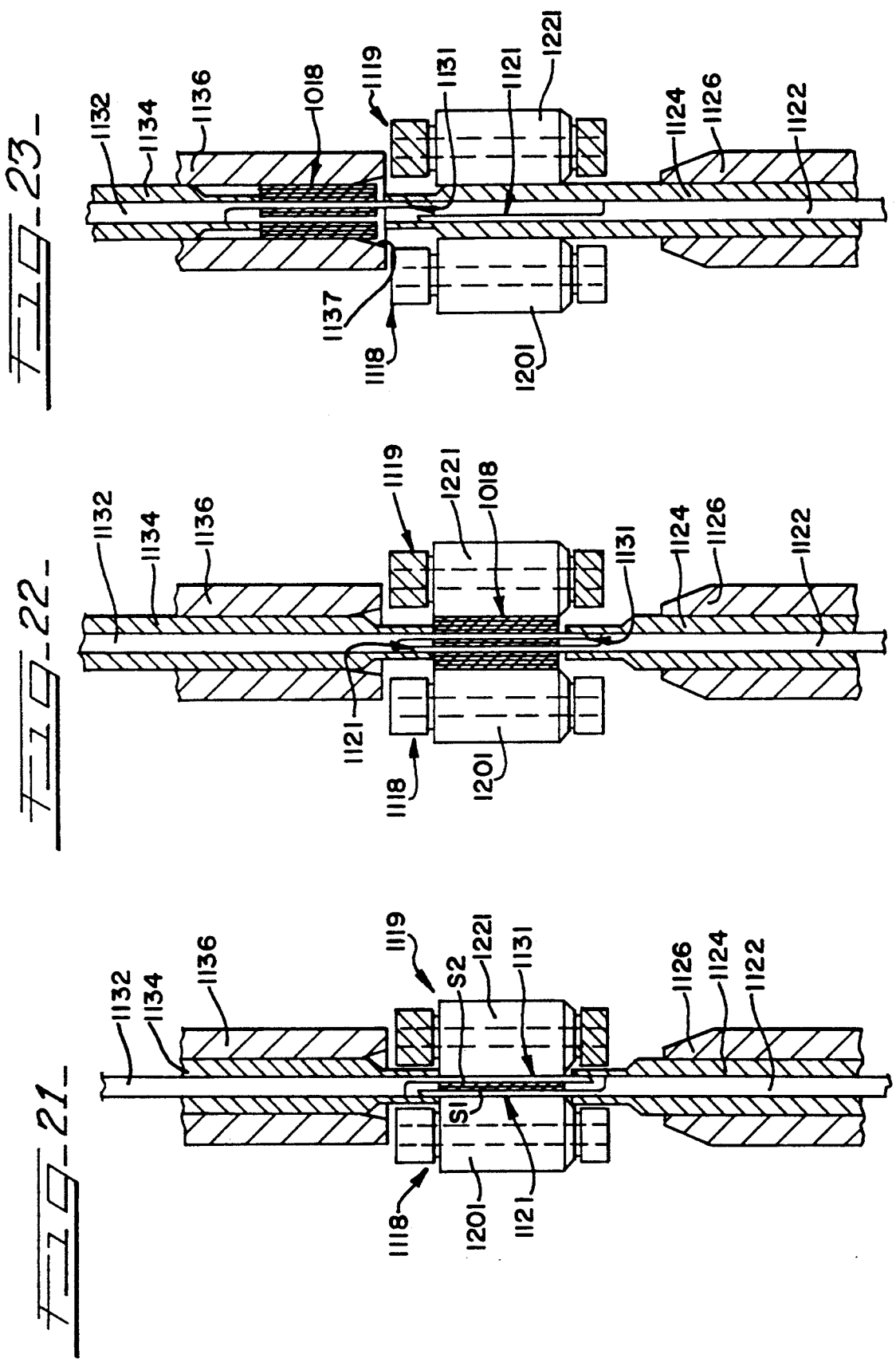

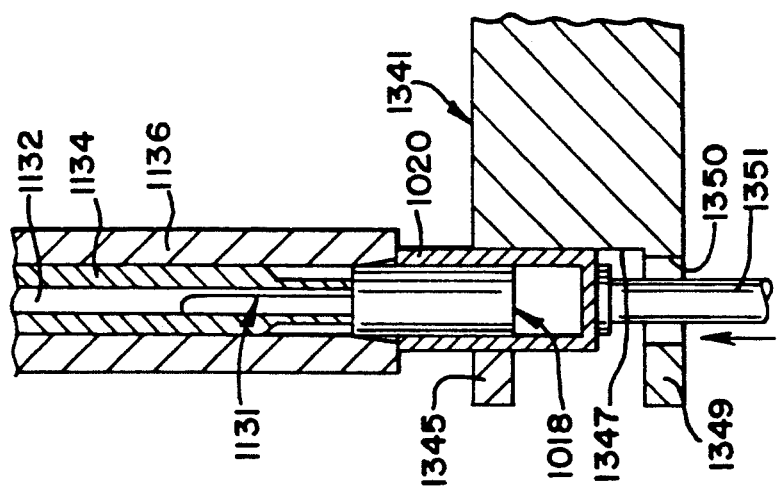
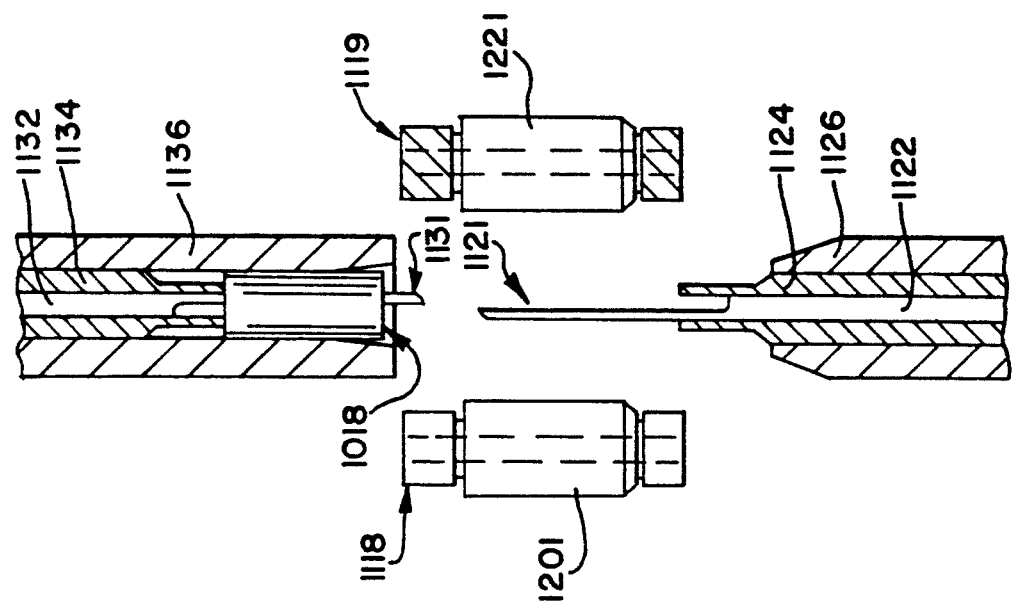
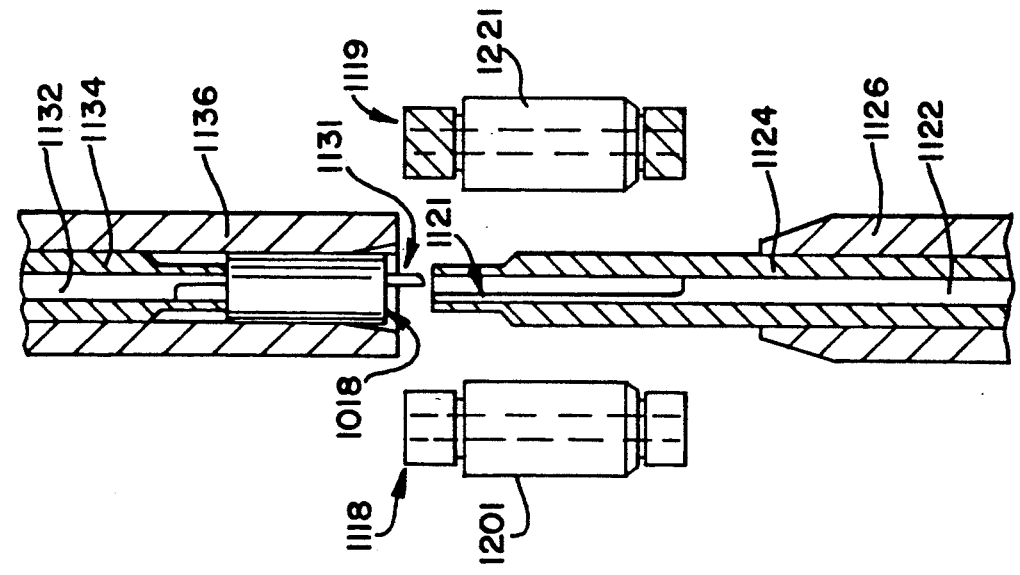

METHOD AND APPARATUS FOR WINDING A CORE FOR AN ELECTROCHEMICAL CELL AND PROCESSING THEREOF

CROSS-REFERENCE TO RELATED APPLICATION

This is a continuation-in-part application of co-pending U.S.A. patent application Ser. No. 07/611,999 filed Nov. 9, 1990 now abandoned by James E. Ribordy.

TECHNICAL FIELD

This invention relates to electrochemical cells of a spirally wound electrode design. The invention is particularly well suited for fabrication of a rechargeable, secondary cell incorporating a sheet of an anode plate material and a sheet of a cathode plate material separated by flexible separator sheets.

BACKGROUND OF THE INVENTION AND TECHNICAL PROBLEMS POSED BY THE PRIOR ART

The prior art teaches various designs for electrochemical cells in which a sheet-like anode plate, sheet-like cathode plate, and separator sheets are spirally wound in the form of a coiled core which can be inserted into a metal casing or can. U.S. Pat. Nos. 4,699,856, No. 4,702,978, and No. 4,707,421 disclose various designs proposed for spirally wound electrochemical cell cores.

During the discharge of an electrochemical cell, diffusion of ions .from the anode into the cathode occurs. Minimization of the diffusion distance is typically achieved in a spirally wound cell by providing a coiled core in which the cathode material has anode material on both sides of it. Separator sheets can be provided which permit the passage of ions and gas.

Some kinds of spirally wound cores may be fabricated by conventional machines. One such conventional machine is sold under the trade name "Nickel Cadmium - Battery Winder" in the United States of America by Weiler Engineering Company, 2445 East Oakton Street, Arlington Heights, Ill. 60005 U.S.A. While this machine functions well in fabricating spirally wound cores of the type for which it is designed, the winding is intermittent and thus relatively slow. Accordingly, there is a need for even better performance and greater versatility.

It would also be desirable to provide an improved method and apparatus for winding an electrochemical cell core in an efficient manner that would have a relatively low likelihood of operational failure.

Further, it would be advantageous if such an improved method and apparatus operated to positively engage and manipulate the core components, including the anode plate, cathode plate, and separator sheets, so as to insure proper registration and winding of the components.

Additionally, it would be beneficial if such an improved method and apparatus could readily accommodate variations in the lengths of the components. It would also be desirable if such an improved method and apparatus could readily accommodate variations in the thicknesses of the components.

SUMMARY OF THE INVENTION

The present invention provides a method and apparatus for more effectively and efficiently fabricating an electrochemical cell of the spiral wound type. One aspect of the invention includes a method and apparatus for forming the core for an electrochemical cell, especially a secondary cell, in a manner that readily accommodates variations in the core component lengths and thicknesses and in a manner that can provide both good registration of the components and a sufficiently tightly coiled core.

In a preferred form of the method, an anode plate is disposed with a first separator sheet in an adjacent relationship restrained against relative lengthwise displacement. Similarly, a cathode plate is disposed with a second separator sheet in an adjacent relationship restrained against relative lengthwise displacement. The end portions of at least the first and second separator sheets are overlapped and restrained against relative movement while rotating the restrained overlapping end portions about an axis to wind the plates and separator sheets into a coiled core which can be inserted into an electrochemical cell casing. According to further aspects of the method, a system is provided for placing the coiled core into an empty electrochemical cell casing through an open end of the casing.

According to a preferred form of the apparatus of the present invention, an assembly means is provided for disposing the anode plate and first separator sheet in an adjacent relationship restrained against relative lengthwise displacement. Similarly, an assembly means is provided for disposing the cathode plate and a second separator sheet in an adjacent relationship restrained against relative lengthwise displacement.

The anode assembly means and the cathode assembly means are arranged for operating so as to overlap an end portion of the first separator sheet with an end portion of the second separator sheet while the anode and the cathode are juxtaposed adjacent to their respective separator sheets. Rotatable clamping means are provided for restraining the overlapping separator sheet end portions against relative movement and for rotating the restrained overlapping end portions about an axis to wind continuously the plates and separator sheets into the coiled core configuration. The preferred embodiment of the apparatus includes further systems for placing the coiled core into an empty electrochemical cell can or casing.

The method and apparatus of the present invention provide an efficient means for positively engaging core components to properly register the core components relative to one another and to form a tightly wound coil.

The method and apparatus of the present invention is particularly effective when employed to fabricate a coiled core for a rechargeable or secondary cell, particularly one having a somewhat stiff anode plate that includes nickel, a somewhat stiff cathode plate that includes cadmium, and flexible, air-pervious (permeable) separator sheets. The present method and apparatus are likewise well suited for the fabrication of nickel hydride secondary cells, lithium primary as well as secondary cells, and the like.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIGS. 2–7 are simplified, generally schematic views illustrating the sequence of the general operational steps of a preferred form of the method of the present invention;

FIG. 8 is a simplified, schematic, diagrammatic, plan view of a preferred embodiment of the apparatus of the present invention for carrying out the method of the present invention;

FIG. 9 is a greatly enlarged, fragmentary, perspective view taken generally along the plane 9—9 in FIG. 8;

FIG. 10 is a view similar to FIG. 9 but showing a further step in the sequence of operation;

FIG. 11 is a greatly enlarged, fragmentary, partial cross-sectional view taken generally along the plane 11—11 in FIG. 8;

FIG. 12 is a greatly enlarged, fragmentary, partial cross-sectional view taken generally along the plane 12—12 in FIG. 8;

FIG. 13 is a view similar to FIG. 12 but showing a further step in the sequence of operation;

FIG. 14 is a view similar to FIG. 8, but showing only a portion of the apparatus with a preferred alternate form of a separator sheet feeder system;

FIG. 15 is a view taken generally along the plane 15—15 in FIG. 14;

FIG. 16 is a view taken generally along the plane 16—16 in FIG. 17;

FIG. 17 is a View taken generally along the plane 17—17 in FIG. 14

FIG. 18 is a fragmentary, perspective, partially cutaway view similar to FIG. 10, but showing a modified winding station which includes alternate, preferred forms of the guide members and mandrels;

FIGS. 19–25 are simplified, fragmentary, cross-sectional views of the winding station shown in FIG. 18 and illustrate the sequence of operation; and FIG. 26 is a fragmentary, cross-sectional view similar to FIGS. 19–25 but showing a moved position of the apparatus to illustrate a subsequent processing

DESCRIPTION OF THE PREFERRED EMBODIMENTS

Figure 1:
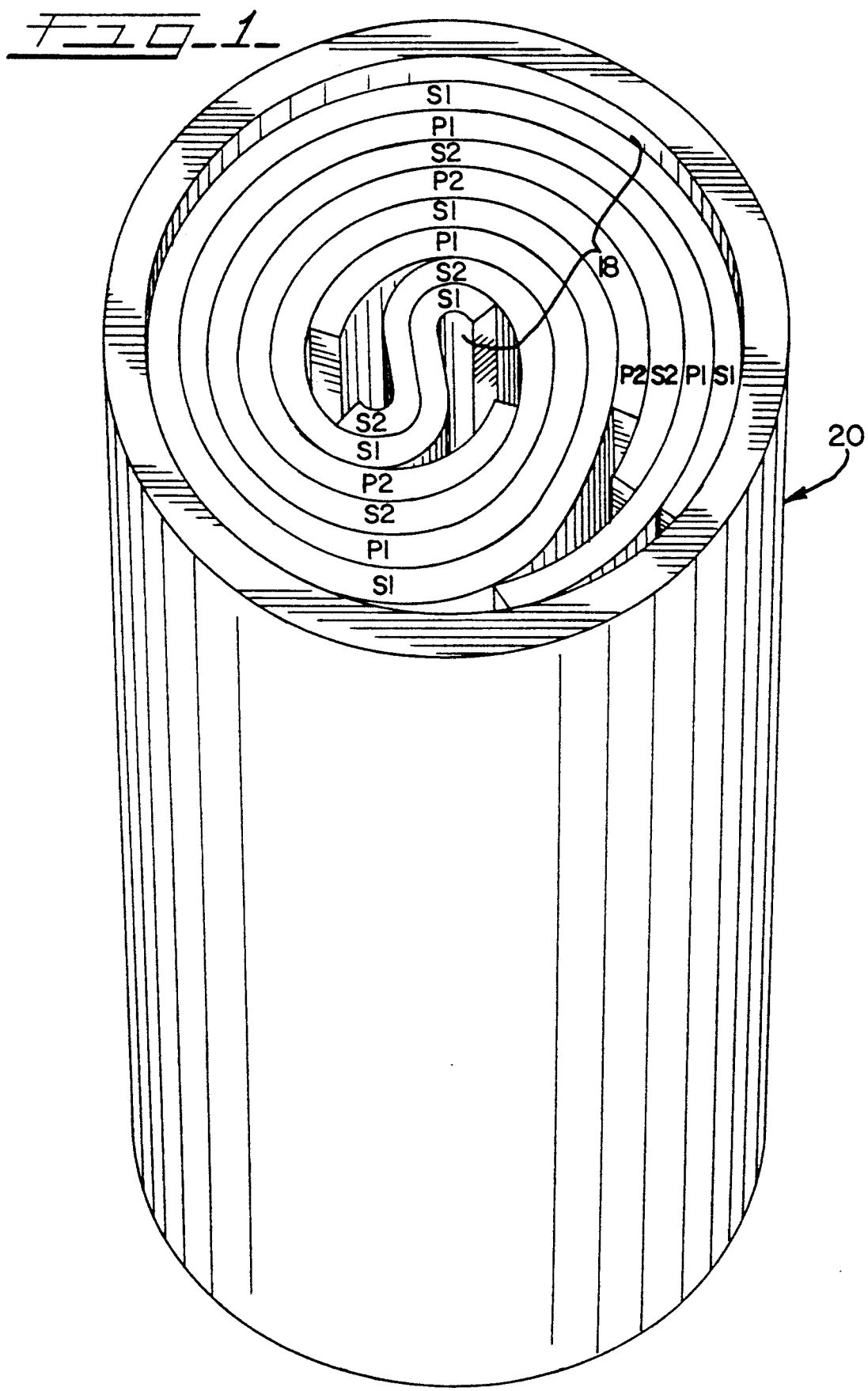
FIG. 1 is a perspective view of a fabricated subassembly for an electrochemical cell, and the subassembly includes an open ended casing or can in which is disposed a spirally wound electrode package in the form of a coiled core.

While this invention is susceptible of embodiment in many different forms, this specification and the accompanying drawings disclose only some specific forms as examples of the use of the invention. The invention is not intended to be limited to the embodiments so described, and the scope of the invention will be pointed out in the appended claims.

For ease of description, the apparatus of this invention is described in a selected, upright operating position, and terms such as upper, lower, horizontal, etc., are used with reference to this position. It will be understood, however, that the apparatus of this invention may be manufactured, stored, transported, used, and sold in an orientation other than the position described.

Some of the figures illustrating the preferred embodiment of the apparatus show structural details and mechanical elements that will be readily recognized by one skilled in the art. However, the detailed descriptions of such elements are not necessary to an understanding of the invention, and accordingly, are not herein presented.

According to the present invention, a novel electrode package, in the form of a spirally wound, coiled core is effectively fabricated by means of a unique process and apparatus. According to a further aspect of the invention, a subassembly comprising the coiled core and an open cell casing or can is fabricated by employing a method and apparatus for inserting the core into the can.

The present invention method and apparatus function to effectively and efficiently fabricate the core and the casing/core subassembly. The novel method and apparatus can accommodate core components of varying lengths and thicknesses while providing good registration and a tightly wound coil configuration.

The Spiral Wound Core/Casing Subassembly

FIG. 1 illustrates a subassembly of an electrochemical cell casing or can 20 with an inserted electrode package in the form of a spirally wound, coiled core 18. The coiled core 18, in the particular embodiment illustrated in FIG. 1, includes a first plate P1. In the preferred embodiment, the first plate P1 is an anode plate. In a secondary or rechargeable cell, the anode plate may include, for example, a sheet of material which contains nickel and which is somewhat stiff, but which can be easily deformed and rolled or wound. In a particular embodiment that may be fabricated, the anode plate has very little elasticity, and, if it is wound into a coiled configuration, it tends to retain that general configuration. The particular chemical composition of the anode plate forms no part of the present invention.

A second plate P2, which is a cathode plate, is wound inwardly of the first plate P1. In a secondary or rechargeable cell, the cathode plate P2 can include a cadmium material. The cathode plate may also have very little elasticity so that, if it is wound into a coiled configuration, it tends to retain that configuration. The particular chemical composition of the cathode plate forms no part of the present invention.

Separator sheets S1 and S2 are provided for separating the anode plate P1 from the cathode plate P2. The separator sheets S1 and S2 permit the transport of ions and gas and may consist of synthetic resin fibers, or other suitable materials well known to those of skill in the art. It has been determined with respect to the present invention that if one selects separator sheets that are sufficiently permeable with respect to air, then a unique apparatus may be employed to grip and manipulate the separator sheets together with the anode and cathode plates in a manner that permits them to be positioned and then wound into the coiled core in accordance with the teachings of the present invention.

As illustrated in FIG. 1, the inner ends of the separator sheets S1 and S2 are overlapped in generally face-to-face relationship, and the first separator sheet S1 is spirally wound between the outwardly facing surface of the anode plate P1 and the inwardly facing surface of the cathode plate P2. The second separator sheet S2 is spirally wound between the outwardly facing surface of the cathode plate P2 and the inwardly facing surface of the anode plate P1.

Depending upon the casing/plate contact or terminal configuration employed in the electrochemical cell, the outermost ends of the cathode and anode plates and separator sheets may or may not be substantially coteminus. In the embodiment illustrated in FIG. 1, the ends of the separator sheets S1 and S2 extend somewhat beyond the end of the cathode plate P2. Also, the anode plate P1 extends substantially beyond the ends of the separator sheets S1 and. S2 as well as beyond the end of the cathode plate P2. Indeed, the anode plate P1 extends into electrical contact with the inside surface of the casing 20. In a preferred embodiment, the anode plate P1 may extend completely around, and be in contact with, the inside surface of the casing 20. (For purposes of simplification and ease of illustration, such a configuration is not shown in FIG. 1.)

In one preferred electrochemical cell construction, the bottom edge of the cathode plate P2 may be provided with a conducting extension or tab for being bent over into engagement with the casing bottom end (not visible in FIG. 1). Similarly, the upper edge of the anode plate P1 may be provided with an extension or tab (not illustrated in FIG. 1) for engaging the cap (not illustrated) which is subsequently applied to the open, upper end of the casing 20. Various designs for providing electrical contact between the cathode plate P2 and the casing and for providing electrical contact between the anode plate P1 and the cap are well known, and the choice of such designs, and the structural details relating thereto, form no part of the present invention.

General Method Of Operation

Sequential steps for forming the coiled core of the anode plate, cathode plate, and separator sheet are illustrated generally in FIGS. 2–7. Initially, as illustrated in FIG. 2, predetermined lengths of the separator sheet 81 and anode plate P1 are provided and are disposed in an adjacent relationship and juxtaposed relative to one another. To this end, the plate P1 may be moved toward the separator sheet S1 in the direction of the arrow 21, and the separator sheet S1 may be moved toward the anode plate P1 in the direction of the arrow.

Similarly, predetermined lengths of the separator sheet S2 and cathode plate P2 are disposed in an adjacent relationship and Juxtaposed relative to one another. To this end, the separator S2 may be moved toward the cathode plate P2 in the direction of the arrow 25 and the cathode plate P2 may be moved toward the separator sheet S2 in the direction of the arrow 27.

It will be appreciated that the movement of the plates P1 and P2 and of the separator sheets S1 and S2 need not be along straight lines, but may be along any suitable path implemented by machine elements so as to create the adjacent and Juxtaposed relationship. It will also be appreciated that the sheets and plates need not be moved together or simultaneously. Indeed, in one alternate form of the general method, the desired relationship of each plate and separator pair can be established subsequent to some other process steps described hereinafter.

It can be seen in FIG. 2 that the right-hand end portion of the separator sheet S1 extends beyond the anode plate P1. Similarly, the left-hand end portion of the separator sheet S2 extends beyond the end of the cathode plate P2. This provides extending end portions of the separator sheets that may be positioned in an overlapping relationship as illustrated in FIG. 3.

For purposes of simplifying the explanation of the core component positioning process, FIG. 3 conceptually shows one general way in which the overlapping relationship may be effected by moving each electrode/separator sheet assembly toward the other from opposite directions, i.e., by (1) moving the separator sheet S1 and the adjacent anode plate P1 together toward the right as indicated by arrow 31 and (2) moving the separator sheet S2 and the adjacent cathode plate P2 together toward the left as indicated by arrow 33. It will be appreciated that other positioning motions may be employed to effect the desired separator sheet overlap illustrated in FIG. 3. Indeed, that is the case with one preferred embodiment of the invention apparatus which is described in detail hereinafter with reference to FIG. 8. In that apparatus, the plate/sheet pairs approach each other from opposite directions, and then the pairs pass each other with the sheet extension portions trailing until only the trailing portions are overlapping.

It will also be appreciated that the overlapping relationship of the end portions of the separator sheets S1 and S2 may be achieved by moving the sheets S1 and S2 separately and sequentially, or simultaneously, along suitable paths which need not be straight line paths. Further, one of the sheets may remain stationary while the other sheet is moved into position.

A variety of other positioning movement sequences can be employed which would ultimately result in the overlapping configuration illustrated in FIG. 3. For example, instead of first moving the anode plate P1 and separator sheet S1 into an adjacent relationship as illustrated in FIG. 2, and instead of moving the separator sheet S2 and cathode plate P2 into an adjacent relationship as illustrated in FIG. 2, the first separator sheet S1 and second separator sheet S2 can be initially positioned with the end portions in overlapping relationship (as in FIG. 3), and then the anode plate P1 and cathode plate P2 can be moved into the positions illustrated in FIG. 3.

Alternatively, the anode plate P1 and separator sheet S1 can be disposed in an adjacent relationship without the right-hand end portion of the first separator sheet S1 extending beyond the anode plate P1. Subsequently, relative movement can be effected between the anode plate P1 and the first separator sheet S1 so as to extend the right-hand end portion of the first separator sheet S1 beyond the anode plate P1 as shown in FIG. 2. An analogous procedure can of course, be effected with the second separator sheet S2 and the cathode plate P2 to provide the left-hand end extension of the separator sheet S2.

In the preferred embodiment, the first separator sheet S1 and anode plate P1 are restrained against relative lengthwise displacement so that anode plate P1 and separator sheet S1 can be moved together to the position illustrated in FIG. 3. Similarly, the second separator sheet S2 and the cathode plate P2 are restrained against relative lengthwise displacement so that they can be moved together to the position illustrated in FIG. 3 from a substantially opposite direction. Then, after the end portions of the separator sheets S1 and S2 are overlapped, the overlapping end portions are restrained against relative movement. This is diagrammatically illustrated in FIG. 4 wherein a pair of clamping means or members M1 and M2 engage opposite sides of the separator sheets which are then clamped between the members M1 and M2.

Next, as illustrated in FIG. 5, the clamping members M1 and M2 are rotated about an axis of rotation (which is normal to the plane of FIG. 5). The clamping members M1 and M2 are rotated continuously in a clockwise direction as indicated by the arrow 40 in FIGS. 5, 6, and 7. It will be appreciated, however, that, depending upon the lengths of the separator sheets and plates, and depending upon the desired coiled configuration of the code 18, the clamping members M1 and M2 could be rotated in the opposite direction.

As the clamping members M1 and M2 are rotated, guide members, such as guide members G1 and G2, are preferably located relatively close to the axis of rotation of the guide members M1 and M2. Preferably, the guide members G1 and G2 are oriented about 180 degrees apart on a line passing through the axis of rotation. The guide members G1 and G2 prevent the trailing portions of the plates and separator sheets from swinging outwardly during rotation. The members G1 and G2, in effect, each apply an inwardly directed force to the windings which are formed by, and defined by, the trailing portions of the plates and separator sheets.

If the guide members G1 and G2 are initially located radially inwardly relatively close to (or initially against) the clamping members M1 and M2, then the guide members G1 and G2 must move radially outwardly to accommodate the increasing diameter of the wraps, turns, or windings of the coiled core as it is being formed. Preferably, the guide members G1 and G2 are biased inwardly toward the clamp members, and as the core diameter increases, the guide members are urged outwardly.

Alternatively, if the guide members G1 and G2 are initially located radially outwardly a sufficient amount to accommodate the final core diameter, then further outward movement of the guide members G1 and G2 would not be required. Of course, the efficiency of the present continuous winding process and the tightness of the coiled core can be effected also by the use of fixed guide members G1 and G2 which do not initially bear against the first few windings or turns of the coil. The desirability of using movable, rather than fixed, guide members G1 and G2 can be affected by the nature of the code components, including the thickness of the core components, the length of the core components, stiffness, etc.

With reference to FIGS. 1 and 7, it can be seen that the anode plate P1 extends beyond the ends of the cathode plate P2 and separator sheets S1 and S2 in the outermost core winding. Such a core configuration is achieved by providing the core components with appropriate lengths and establishing appropriate relative positions. In particular, the separator sheets S1 and S2 are of substantially equal length, while the cathode plate P2 is somewhat shorter and is positioned, as illustrated in FIG. 2, inwardly of the ends of the second separator sheet S2. Because the two separator sheets S1 and S2 are of equal length, when the components are wound, the outer ends of the separator sheets S1 and S2 will be substantially coterminous and extend beyond the outer most end of the cathode plate P2.

As shown in FIG. 2, the anode plate P1 is initially positioned relative to the first separator sheet S1 so that the outermost end of the anode plate P1 extends beyond the other core components at the end of the outermost winding as illustrated in FIGS. 1 and 7.

With reference to FIGS. 3 and 4, it will be appreciated that the anode plate P1 and cathode plate P2 do not extend into the overlapping region that becomes clamped by the rotating members M1 and M2. This prevents electrical contact between the anode plate P1 and cathode plate P2. However, it will also be appreciated that the anode plate P1 can be positioned on the other side of the first separator sheet S1 (on the bottom of sheet S1 as viewed in FIG. 3), and the cathode plate P2 can be positioned on the other side of the second separator sheet S2 (on the top of sheet S2 as viewed in FIG. 3). In such a configuration, the anode and cathode plates are still facing in opposite directions and are separated by the two separator sheets S1 and S2 at the region of overlap. This permits, if desired, the placement of the ends of the anode plate P1 and cathode plate P2 in the overlap region. All four elements can then be clamped between the clamping members M1 and M2 and rotated to form the coiled core 18. Continuous winding of the coiled core elements permits a relatively high speed operation.

After the core 18 is formed as illustrated in FIG. 7, the core 18 can be deposited in the cell casing or can. The guide members G1 and G2 may be employed to maintain the coil configuration during insertion of the coiled core 18 into the can, or other suitable holders can be provided. One or both of the clamping members M1 and M2 may be removed from the coiled core 18 prior to insertion of the core into the casing. Alternatively, one or both of the clamping members M1 and M2 may be maintained at a predetermined axial position while the coiled core 18 is moved axially off of one or both of the clamping members M1 and M2 into the can.

Apparatus For Forming The Core And Inserting It Into A Casing

One form of the above-described method for forming an electrochemical cell core 18 can be effected by the novel apparatus illustrated in FIGS. 8-13. A simplified, partially diagrammatic view of major components of the apparatus are shown in FIG. 8. A brief overview of some of the major components will first be presented with reference to FIG. 8 and will be followed by a more detailed discussion. Preferred alternate embodiments will be discussed thereafter.

In the lower, right-hand corner of FIG. 8 there is illustrated a casing receiving and dispensing assembly 50 which receives empty casings 20 from a supply of empty casings and which discharges full casings 20 which each contain an electrode package in the form of a coiled core 18. The coiled cores 18 are inserted into the casings 20 from an adjacent, intermediate dial mechanism 54.

The cores 18 are provided to the dial mechanism 54 by component feeder and assembly mechanisms. In particular, the first separator sheet S1 and anode plate P1 are assembled by a first separator sheet feeder system 61 and anode plate feeder system 62 which supply the sheet S1 and plate P1 to a first rotating turret 65.

The second separator sheet S2 and cathode plate P2 are assembled by a second separator sheet feeder system 67 and a cathode plate feeder system 69 which supply the sheet S2 and plate P2 to a second rotating turret 70. The turrets 65 and 70 cooperatively function, as will be explained in detail hereinafter, to form the coiled cores 18 seriatim, and the second rotating turret 70 then carries each completely wound core 18 to the intermediate dial 54 to which the core 18 is transferred for subsequent insertion into a casing 20 at the assembly 50.

The various assemblies and mechanisms will next be described in more detail. The first turret 65 rotates in the direction indicated by the arrow 116 and receives the first separator sheets S1 which are initially supplied in the form of a continuous web 81 from a roll 83 in the feeder system 61. The feeder system 61 also includes a roller 85, vacuum transport drum 87, and cutter wire 90. The web 81 is directed around the roller 85 to the vacuum feed drum 87 which rotates in the direction indicated by the arrow 112. The drum 87 includes perforations (not visible) on its cylindrical face. A vacuum system (not visible in the Figures) is provided to reduce the pressure within the drum 87 so as to cause the web 81 to be held against the cylindrical surface of the drum 87 by the ambient atmospheric pressure.

The drum 87 is rotated until a predetermined length of web 81 has been wrapped on the drum 87, and then the drum rotation is terminated while a mechanism holding the cutter wire 90 is employed to sever the web 81 to form an individual separator sheet S1. To this end, the assembly of the roller 85 and drum 87 may be moved together, to the left as viewed in FIG. 8, against the wire 90. The drum 87, in the preferred embodiment, includes one or more grooves 92 in the surface of the drum to receive the wire 90 as it cuts through the web 81.

Conventional designs may be employed for the structure of the assembly for supporting the roll 83, of the roller 85, of the drum 87, of the vacuum system and rotating mechanism for the drum 87, and of the cutter wire 90. Such conventional designs may include conventional components well known to those of ordinary skill in the art. The details of the conventional component designs, drive systems, and control systems form no part of the present invention and are not herein described in detail.

The second turret 70 rotates in the direction indicated by the arrow 116' and receives the second separator sheets S2 which are initially supplied in the form of a continuous web 81' from a roll 83'. The web 81' is directed around a roller 85' to a vacuum feed drum 87' which rotates in the direction of the arrow 112'. A cutter wire 90' is provided to sever the web 81' to form the individual second separator sheets S2. The roll 83' roller 85', drum 87' and cutter wire 90' make up the second separator sheet feeder system 67, and the structure and operation of these components are substantially identical to the structure and operation, respectively, of the above-described components of the first feeder system 61.

The drum 87 feeds each first separator sheet S1 in one direction to the rotating first turret 65, and the drum 87' feeds each second separator sheet S2 in the opposite direction to the rotating second turret 70. The rotating turrets 65 and 70 each include a plurality of holding members 102 which each receive a separator sheet (sheets S1 at turret 65 and sheets S2 at turret 70).

Each turret 65 and 70 includes a frame 104 to which the holding members 102 are mounted and which is rotatable by a suitable drive means (not illustrated). Adjacent the trailing end of each holding member 102 on the first turret 65 is a lower mandrel 121 and roller guide member 118 for engaging the separator sheet S1 in a manner described in detail hereinafter. On the second turret 70 there is an upper mandrel 131 and guide member 119 provided adjacent each holding member 102 for engaging the second separator sheet S2 in a manner described in detail hereinafter.

Preferably, the turrets 65 and 70 and the associated separator sheet feed drums 87 and 87', respectively, are controlled to incrementally rotate or index in 60 degree angular increments of rotation. At the end of each increment of 60 degree rotation, there is a dwell period while other operations are performed (such as cutting the webs 81 and 81' and other operations as will be described in detail hereinafter). Each turret frame 104 and the means for rotating the turret may include conventional components, drive mechanisms, and control means, the details of which form no part of the present invention.

As best illustrated in FIG. 9, each holding member 102 has a holding face 104 in which are defined a plurality of apertures 106 through which vacuum (more specifically, a reduced pressure) may be drawn from an internal passage 108 by means of a suitable vacuum system (not illustrated) that communicates therewith. The details of the vacuum system and controls therefor may be of a suitable conventional design and form no part of the present invention.

As illustrated in FIG. 8, the feed drum 87 rotates in the direction indicated by the arrow 112 to carry a separator sheet S1 to a holding member 102 which is being carried by the frame 104 of the turret 65 along a circular path in a direction of rotation indicated by the arrow 116. As the drum 87 carries the leading edge of the separator sheet S1 against the adjacent (but moving) holding member 102, the leading end of the separator sheet S1 is transferred to the holding member 102. This is effected by employing a greater vacuum holding force in the holding member 102, or by terminating the vacuum condition in the drum 87 in the region of the drum that is adjacent the holding member 102. Such conventional techniques for transferring the separator sheet S1 from the vacuum holding drum 87 to the vacuum holding member 102 are well known to those of ordinary skill in the art. The details of such conventional techniques and systems form no part of the present invention.

The process described above for feeding the first separator sheets S1 to the holding members 102 of the first turret 65 is also used for feeding the second separator sheets S2 from the drum 87' to the holding members 102 of the second turret 70 which is adjacent the first turret 65 and which is rotating in the same direction as the first turret 65 as indicated by the arrow 116'. Since the turrets 65 and 70 are adjacent and are rotating in the same direction of rotation, the holding members 102 on the turret 65 approach and pass by the holding members 102 of the second turret 70 in a direction generally opposite to the direction of the adjacent holding members 102 on the second turret 70.

With reference to FIG. 8, it can be seen that as the first separator sheet S1 is fed from the feed drum 87 onto the holding member 102, an end portion of the sheet S1 extends beyond an end of the holding member 102. The second separator sheet S2 is fed from the feed drum 87' onto a holding member 102 of the second turret 70 in the same manner so that an end portion of the sheet S2 extends beyond an end of the holding member 102. This is accomplished by a suitable control and drive system which times the position of the rotating holding member 102 relative to the rotation of the feed drum (87 or 87'). On the turret 65, each first separator sheet S1 is held by a holding member 102 with the extending end portion of the sheet adjacent a mandrel 121. Similarly, on the second turret 70, each second separator sheet S2 is held by a holding member 102 with an end portion of the sheet extending adjacent the mandrel 131. This permits the mandrels to grip the separator sheets when winding the core in a manner described in detail hereinafter.

Prior to the components being wound to form the core, the anode and cathode plates must be properly positioned. To this end, the anode plates P1 and cathode plates P2 are fed to the first turret 65 and second turret 70, respectively, by the anode plate feeder system 62 and cathode plate feeder system 69, respectively. In particular, the anode plates P1 are initially supplied adjacent the first turret 65 in a face-to-face stack within a magazine 180. A conventional pick and place assembly 182 is provided between the anode plate magazine 180 and the first turret 65.

The anode plate pick and place assembly 182 may be of any suitable design well known to those of ordinary skill in the art. The details of the assembly 182 form no part of the present invention. The assembly 182, in the preferred embodiment illustrated, includes four vacuum pick up arms 184. Each arm 184 is adapted to engage an anode plate P1 at the magazine 180. As the assembly rotates in the direction indicated by the arrow 186, the anode plate P1 is carried into registry with a holding member 102 on the first turret 65. The anode plate P1 is deposited on top of the first separator sheet 81. In the preferred embodiment, the separator sheet S1 is permeable or pervious to air so that vacuum drawn by the holding member 102 is also drawn through the sheet S1 whereby the ambient atmospheric pressure forces the anode plate P1 against the separator sheet S1.

As the assembly 182 rotates the arm 184 away from the holding member 102, the anode plate P1 remains held against the separator sheet 81 on the holding member 102. This is effected by employing greater vacuum holding force in the holding member 102, or by temporarily terminating the vacuum condition in the adjacent arm 184. Such conventional techniques for transferring the anode plate are well known to those of ordinary skill in the art. The details of such conventional techniques and systems form no part of the present invention.

The cathode plates P2 are similarly fed to the second turret 70. In particular, the cathode plates P2 are arranged in a face-to-face stack in a cathode plate magazine 180' which, together with a cathode plate pick and place assembly 182' makes up the cathode plate feeder system 69. The assembly 182' rotates in the direction of the arrow 186' and includes a plurality of arms 184'.

The cathode plate pick and place assembly 182' operates by vacuum to transfer a cathode plate P2 from the magazine 181' to a holding member 102 in the same manner as described above with respect to the anode plate pick and place assembly 182. The cathode plate P2 is deposited on top of the second separator sheet S2 on the holding member 102. The second separator sheet S2, like the first separator sheet S1, is permeable or pervious to air. Thus, vacuum drawn in the holding member 102 is also drawn through the second separator sheet S2 for retaining the cathode plate P2 against the separator sheet S2.

As illustrated in FIG. 8, the first turret 65 rotates in the direction indicated by the arrow 116 to carry each anode plate P1 and separator sheet S1 pair to the region between the turrets 65 and 70. Similarly, the second turret 70 rotates in the direction indicated by the arrow 116' to carry each separator sheet S2 and cathode plate P2 pair into the region between the turrets 65 and 70. The incremental rotation of the turrets 65 and 70 is continued until a holding member 102 on the turret 65 and a holding member 102 on the turret 70 pass each other and become aligned in a parallel relationship with the extending end portions of the separator sheets S1 and S2 overlapping as illustrated in FIGS. 8 and 9. In this position, the extending end portions of the separator sheets S1 and S2 are located between the mandrels 121 and 131.

Each mandrel 121 and 131 has a rod-like configuration. The lower mandrel 121 has an upper end 122, a semi-cylindrical surface 123, and a flat clamping surface 125 as illustrated in FIG. 9. The clamping surface 125 is adapted to contact and bear against the extending end portion of the first separator sheet S1.

As shown in FIG. 9, each upper mandrel 131 has a lower end 132, a semi-cylindrical surface 133, and a flat clamping surface 135. The clamping surface 135 is adapted to contact and bear against the extending end portion of the second separator sheet S2.

The lower mandrel 121 can be moved vertically —between the raised position illustrated in FIG. 9 and a lowered position below the extending portion of the separator sheet S1—by a suitable mechanism (not illustrated) associated with the turret Conventional mechanisms, such as cam systems, that are well known to those of ordinary skill in the art may be employed for this purpose. The details of such conventional mechanisms form no part of the present invention.

Unlike the mandrel 121, the mandrel 131 is not adapted to be moved vertically away from the separator sheets. Rather, the mandrel 131 always remains at the same vertical elevation as shown in FIG. 9.

Each lower mandrel 121 and each upper mandrel 131 is adapted to rotate. Specifically, the lower mandrel 121 and the upper mandrel 131, when moved to the location between the turrets 65 and 70 as illustrated in FIG. 9, can be rotated together about a central axis A that extends vertically between them along the inner face of the separator sheets S1 and S2. The rotation of the mandrels 121 and 131 together can be effected by suitable conventional drive mechanisms well known to those of ordinary skill in the art, the details of which form no part of the present invention. The two mandrels 121 and 131 function as the rotatable clamping members M1 and M2 discussed above with reference to FIGS. 5–7 which schematically illustrate a form of the general method of the invention.

The guide members 118 and 119 are located adjacent the mandrels 121 and 131 as illustrated in FIG. 9. The guide member 118 comprises a roller 201 mounted for rotation on a shaft 202 between a pair of arms 203 which are pivotally mounted on a shaft 205 carried in a pair of brackets 207 mounted to the holding member 102 on the turret 65. A torsion spring 209 is engaged between one of the brackets 207 and the shaft 205 to bias the roller 201 toward and against the lower mandrel 121.

The guide member 119 includes a block 221 pivotally mounted on a shaft 222 between a pair of arms 223 which are carried by a shaft 225 mounted in a pair of brackets 227 on the holding member 102 on the turret 70. A torsion spring 229 is engaged with one of the brackets 227 and the shaft 225 to bias the block 221 toward and against the upper mandrel 131. The guide member block 221 has a generally smooth, concave surface 231.

The guide members 118 and 119 function as the guide members G1 and G2 discussed above with reference to FIGS. 5–7 which schematically illustrated form a general method of the invention.

The arrangement of the components as illustrated in FIG. 9 defines a "winding station" in which the separator sheets and plates are wound to form the coiled core.

At the winding station, the mandrels 121 and 131 are rotated about the axis A in the direction indicated by the arrow 240 (FIG. 9). As the mandrels rotate, the separator sheets begin to wind around the mandrels in the manner discussed in detail with respect to the schematic illustrations in FIGS. 5-7. With reference to FIG. 9, each separator sheet S1 and S2 is pulled toward the mandrels and slides along the holding member 102 against which it is being held by the vacuum drawn inside of the holding member. As this occurs, the ambient atmospheric pressure continues to hold the separator sheet against the holding member 102.

In addition, the anode plate P1 is being forced by ambient atmospheric pressure against the separator sheet S1, and the cathode plate P2 is being forced against the second separator sheet S2. However, as the first separator sheet S1 wraps around the mandrels and is pulled along the surface of the holding member 102, the anode plate P1 is necessarily moved along with the separator sheet S1 toward the mandrels. Similarly, as the second separator sheet S2 is wound around the mandrels and pulled toward the mandrels along the face of the holding member 102, the cathode plate P2 is necessarily carried along with the second separator sheet S2.

In order to insure that the anode plate P1 remains tightly engaged with the separator sheet S1, and in order to insure that the cathode plate P2 remains tightly engaged with the second separator sheet S2, additional force is applied to the anode plate P1 and to the cathode plate P2 by rollers 241 and 242, respectively. Roller 241 is carried by a suitable roller assembly actuator 244, and roller 242 is carried by a suitable roller actuator assembly 246. The assemblies 244 and 246 move the rollers 241 and 242 into position and maintain them against the plates during the winding process. Suitable conventional actuators, such as hydraulic actuators or the like, may be employed for this purpose. The details of the actuator and controls therefor form no part of the present invention.

As the sheets S1 and S2 wind around the mandrels 121 and 131, the plates P1 and P2 also begin to be wound around the mandrels. As the diameter of the forming coil increases, the guide member roller 201 and the guide member block 221 are pushed outwardly against the biasing force of the torsion springs 209 and 229, respectively.

Depending upon the strength of the vacuum drawn within the holding members 102, upon the particular composition of the sheets S1 and S2, and upon the size, weight, and composition of the plates P1 and P2, a satisfactory winding process could be effected without the need for the rollers 241 and 242.

Although FIG. 9 illustrates a specific form of the guide members 118 and 119, it is to be realized that the present invention contemplates the use of other 10 forms of guide members. For example, the guide member block 221 adjacent the upper mandrel 131 could be replaced with a roller similar to the roller 201 on the guide member 118. Shapes other than the roller 201 or guide block 221 could also be employed. Additionally, means other than the torsion springs 209 and 229 could be provided for biasing the guide members 118 and 119, respectively, toward the mandrels. Indeed, depending upon the flexibility of the core component sheets and plates, stationary guide members could be employed at a fixed distance from the mandrels.

In any event, after the components have been wound to form the coiled core as illustrated in FIG. 10, the lower mandrel 121 is moved axially downwardly (as indicated by arrow 300 in FIG. 8) to disengage it from the core 18. The core 18 remains wrapped around the upper mandrel 131 and retained in the coiled configuration by at least the guide member 119 on the second turret 70. The guide member 118 also remains temporarily engaged with the core 18 until the core 18 is moved away from the winding station as described hereinafter.

With reference to FIG. 8, the coiled core 18 is moved from the winding station by continuing the incremental rotation of the turret 70 in the direction indicated by the arrow 116'. This causes the holding member 102, along with the associated mandrel 131 and guide member 119, to carry the coiled core 18 toward the intermediate dial mechanism 54. The first and second turrets 70 rotate together so that, as the second turret 70 rotates to carry the formed core 18 away from the winding station, the first turret 65 rotates and carries the guide member 118 away from the formed core 18.

The turrets 65 and 70 rotate through 60 degree increments of rotation to bring the next pairs of plates and sheets into the winding station. Prior to each incremental rotation of the turrets, the rollers 241 and 242, if employed for the particular core materials being assembled, are retracted by the actuators 244 and 246.

After the turrets 65 and 70 have been rotated through two 60 degree increments of rotation, the core 18 has been carried to a location overlying the intermediate dial mechanism 54 as illustrated in FIG. 8. At this location, the formed core 18 is pushed down off of the upper mandrel 131 into the dial 54. With reference to FIGS. 8, 11, and 12, the dial 54 includes a disk-like member 301 which is rotatable on a shaft 303 in the direction indicated by the arrow 304 (FIG. 8). The dial disk-like member 301 defines a plurality of circumferentially spaced-apart through holes 307 for each receiving one of the coiled cores 18. At the bottom of each through hole 307, the dial member 301 has an enlarged counter bore 309 for receiving the upper end of a casing 20 (FIG. 12) as will be explained in detail hereinafter.

As illustrated in FIGS. 8-13, there is associated with each dial hole 307 an upwardly projecting stationary guide 313. The guide projects upwardly from the upper surface of the dial 54. The guide 313 has a partially cylindrical configuration which opens radially outwardly. The interior, concave surface of the guide 313 forms a continuation of the cylindrical surface of the hole 307.

The guide 313, when rotated with the dial 54 to the position adjacent the coil 18 on the mandrel 131 as illustrated in FIG. 8, engages the outer surface of the coil 18 on the side of the core generally opposite from the guide block 221. The coil 18 is thus effectively trapped between the guide block 221 and the guide member 313 over the through hole 307. The incremental rotation of the dial 54 is terminated at this point while a pushing sleeve 315 (FIG. 11) is lowered around the mandrel 131 to push the coiled core 18 into the dial 54 through hole 307.

Next the dial 54 and turrets 65 and 70 are rotated through a subsequent increment of rotation. As the dial 54 incrementally rotates in the direction indicated by arrow 304, the coil 18 in the hole 307 becomes positioned over the casing receiving and dispensing assembly 50 as illustrated in FIGS. 8, 12, and 13.

The assembly 50 includes a turntable 341 which is rotatable about a shaft 343 in the direction indicated by the arrow 344. The turntable 341 defines a plurality of circumferentially spaced-apart receiving cavities 347 which each receive a casing 20. Each cavity 347 is generally semi-cylindrical and opens radially outwardly to the periphery of the turntable 341. The battery casings 20 are retained within the cavities 347 of the turntable 341 by a peripheral rail 345 which has a generally circular configuration and which is stationary with respect to the rotatable turntable 341.

The turntable 341 includes a lower flange 349 on which the bottom of each casing 20 rests. The flange 349 defines a plurality of circumferentially spaced-apart access apertures 350. Each aperture 350 is associated with a casing receiving cavity 347 and is oriented generally coaxially therewith. The access apertures 350 accommodate the upward movement of a push rod 351 to engage the bottom of a casing and push it upwardly into the counter bore 309 of the dial 54 as illustrated in FIG. 13.

When the coiled core 18 is moved by the dial 54 to a position over one of the turntable receiving cavities 347 as illustrated in FIGS. 8 and 12, the core 18 can then be pushed downwardly out of the dial 54 and into the receiving cavity 347 of the turntable 341. This is effected, as illustrated in FIG. 13, by employing a plunger 360 which is actuated to move downwardly against the top of the core 18 to push the core 18 out of the dial hole 307 and into the casing 20. Preferably, as illustrated in FIG. 13, the casing 20 is elevated by the push rod 341 so that the casing extends partly out of the receiving cavity 347 so that the upper, open end of the casing 20 is received within the enlarged counter bore 309 below the casing 18.

After the core 18 has been pushed into the elevated casing 20, the push rod 351 is lowered, and the casing 20 is re-seated on the turntable flange 349.

As illustrated in FIG. 8, empty casings 20 are fed into the turntable 341 from a supply guided between an exterior rail 371 and a middle rail 372. The empty casings 20 are fed by suitable means (not illustrated) in the direction of the arrow 373 (FIG. 8).

The full casings which have been loaded with the cores 18 are discharged from the turntable 341 to a path defined between the middle rail 372 and another exterior rail 375 (FIG. 8).

The mechanisms and control systems for operating the dial 54 and turntable 341 in conjunction with the turrets 65 and 70 may be in accordance with any suitable conventional design well known to those of ordinary skill in the art, and the details of such mechanisms and controls form no part of the present invention.

The mechanisms and controls for extending and retracting the sleeve 315 along the upper mandrel 131 employ suitable conventional designs, the details of which form no part of the present invention.

The mechanisms and controls for vertically reciprocating the push rod 351 and the plunger 360 may be of any suitable conventional design well known to those of ordinary skill in the art, and the details of such designs form no part of the present invention.

In the embodiment of the invention described above with reference to FIGS. 8-13, the separator sheets S1 and S2 are severed from continuous webs and are fed onto the holding members 102 by sheet feeder systems 61 and 67 (FIG. 8). Other feeding systems may be employed. Optimization of the feeder system design may depend upon the sheet material, thickness, and operating speed of the core forming apparatus.

A preferred, alternate embodiment for a sheet feeding system is illustrated in FIGS. 14-17. As shown in FIG. 14, an alternate sheet feeder system 61A is provided in place of the system 61 illustrated in FIG. 8 for feeding the first separator sheet S1. It will be appreciated that a system identical to the alternate embodiment feeder system 61A would also preferably be employed, by reversing its orientation from that illustrated in FIG. 14, in place of the second separator sheet feeder system 67 described above with reference to FIG. 8.

The separator sheet material is initially supplied in the form of a continuous web 81A from a roll 83A in the feeder system 61A. The web 81A extends to a feeder assembly 87A which feeds the web onto the adjacent holding member 102 and severs the individual sheet S1 from the trailing portion of the web 81A.

The feeder assembly 87A includes a mounting block 501 which has a plate 502 mounted on one end and a plate 503 mounted on the other end.

Within the block 501, and between the plates 502 and 503, there is a separator sheet guide plate 508 and an adjacent separator sheet guide cover 509. The plate 508 and cover 509 are spaced apart to receive between them the separator web 81A. In the figures the spacing between the plate and cover, and the thickness of the web 81A, are exaggerated for purposes of illustration and clarity.

The web 81A is fed forwardly by a set of rollers, and the drive roller shaft 504 is visible in FIG. 16. The drive rollers are driven by a suitable conventional stepper motor 560. The plate 508 and cover 509 define appropriate cutouts (not visible in the figures) for receiving the rollers which contact the web 81A. The assembly 87A further includes a cam follower 507 mounted on a pinch spacer 506 on a pinch shaft 505. The feeder assembly 87A also includes a pivot arm 542 mounted to the plate 502 and biased to an initial position as illustrated in FIG. 14 by a spring 544 which is connected on one end to the arm 542 and on the other end to a pin 548.

When a predetermined length of the separator web 81A has been dispensed from the feeder assembly 87A, a hot knife assembly is actuated to sever the separator sheet S1, and the hot knife assembly includes an electrically heated knife member or wire 530 (FIG. 15) which is mounted between pivot arms 512 and 513. The pivot arms 512 and 513 are mounted to a block 511 for pivoting in the direction of the double headed arrow 570 (FIGS. 14 and 16). The pivoting movement may be effected by actuation of a conventional pneumatic piston-cylinder actuator (not illustrated).

Suitable conventional control systems (not illustrated) may be provided for timing the actuation of the motor feed and the actuation of the hot wire to sever the web 81A.

The present invention contemplates that various means may be employed for removing the coiled cores 18 from the mandrels 131. For example, after the separator sheets and plates are wound to form the coiled core, the trailing end of the outermost winding may be taped or otherwise connected to the next underlying winding so as to prevent the core from unwinding. The coiled cores could then be removed by various conventional or special processes from the mandrels and placed into casings 20.

For example, following completion of the winding of the coiled core at the winding station between the turrets 65 and 70, the core could be first taped to keep it from unwinding, and then the lower mandrel 131 could be retracted downwardly. Next, the turret 70 could be incrementally rotated to carry the taped, coiled core to a discharge position from which the core could be pushed off of the upper mandrel 131 directly into the open end of a casing 20. In such a process, there would be no need for the intermediate dial 54 and turntable 341 described above.

Further, another modification of the method and apparatus illustrated in FIGS. 8-13 provides a novel system for forming a coiled core and then loading it into a casing without taping the core. Specifically, as presently contemplated, a preferred novel system for winding and processing cores—without the need for an intermediate dial 54 or taping—is illustrated in FIGS. 18-26. FIG. 18 illustrates modified forms of the first embodiment components shown in FIGS. 9 and 10, and these modifications will next be discussed in detail.

In particular, a lower mandrel 1121 is provided for cooperating with an upper mandrel 1131 to engage the separator sheets S1 and S2 and form a coiled core 1018 having the same configuration as the core 18 formed by the first embodiment of the apparatus described above with reference to FIGS. 8-13 As with the embodiment illustrated in FIGS. 8-13, there are a plurality of lower mandrels, and each lower mandrel 1121 is carried on a first turret (such as a turret similar to turret 65 in FIG. 8). Each lower mandrel 1121 is adjacent the trailing end of a holding member (such as the holding member 102 in FIGS. 8 and 9). Similarly, there are a plurality of upper mandrels 1131 each carried on a second turret (similar to the turret 70 illustrated in FIG. 8), and each upper mandrel 1131 is adjacent a holding member (such as a holding member 102 illustrated in FIGS. 8 and 9).

The lower mandrel 1121 has a semi-cylindrical surface 1123 and a flat clamping surface 1125 which is adapted to contact and bear against the extending end portion of the first separator sheet S1. The mandrel 1121 includes a lower portion 1122 which has a generally rod-like configuration and which is slidably disposed within an inner sleeve 1124.

An outer sleeve 1126 surrounds the inner sleeve 1124. The mandrel 1121 is adapted to be reciprocated vertically within, and relative to, the inner sleeve 1124. The inner sleeve 1124 is adapted to be reciprocated vertically within, and relative to, the outer sleeve 1126.

The upper mandrel 1131 has a lower portion defining a semi-cylindrical surface 1133 and a flat clamping surface 1135. The clamping surface 1135 is adapted to contact and bear against the extending end portion of the second separator sheet S2.

The upper portion of the mandrel 1131 has a rod-like portion 1132 which is slidably received within an inner sleeve 1134. All outer, holding sleeve 1136 surrounds the inner sleeve 1134. The inner sleeve 1134 can be vertically reciprocated between, and relative to, the upper mandrel 1131 and outer sleeve 1136. The upper mandrel 1131 can also be reciprocated vertically relative to the outer sleeve 1136.

The upper and lower mandrels 1131 and 1121, respectively, along with the upper and lower inner sleeves 1134 and 1124, respectively, can be vertically positioned by suitable mechanisms (not illustrated) associated with the turrets on which the mandrels are carried. Conventional mechanisms such as cam systems, that are well known to those of ordinary skill in the art may be employed for this purpose. The details of such conventional mechanisms form no part of the present invention.

The two mandrels 1121 and 1131 function as rotatable clamping members in a manner analogous to the mandrels 121 and 131 discussed above with reference to the embodiment illustrated in FIGS. 8-11. The rotation of the mandrels 1121 and 1131 together can be effected by suitable conventional drive mechanisms well known to those of ordinary skill in the art, the details of which form no part of the present invention.

When the separator sheets and plates are rotated on the mandrels to form the coiled core 1018, it is desirable to prevent the trailing portions of the plates and separator sheets from swinging outwardly during rotation. To this end, guide members 1118 and 1119 (FIG. 18) are provided adjacent the core 1018. The guide member 1118 carries a roller 1201 for engaging the core 1018, and the guide member 1119 carries a roller 1221 for engaging the core 1018 on the opposite side from the roller 1201.

The guide members 1118 and 1119 function in a manner generally analogous to the functioning of the guide members 118 and 119 described above with reference to the embodiment illustrated in FIGS. 8-10. Specifically, each guide member 1118 is carried on a turret (similar to the turret 65 illustrated in FIG. 8) adjacent a lower mandrel 1121, and each guide member 1119 is carried on a turret (similar to the turret 70 illustrated in FIG. 8) adjacent an upper mandrel 1131.

However, unlike the spring-biased guide members 118 and 119 described above with reference to FIGS. 8-10, the guide members 1118 and 1119 are provided with suitable mechanisms for holding the guide members outwardly, at certain steps during the sequence of operation (e.g., FIGS. 19, 20, 24 and 25). At other times (e.g., FIGS. 21-23), the guide members 1118 and 1119 are biased inwardly against the mandrels. The mechanism for urging the guide members inwardly toward the mandrels and for holding the guide members away from the mandrels may include any suitable special or conventional design, such as springs with opposing, intermittent cam actuators. The detailed structure and the design of such mechanisms form no part of the present invention.

The sequence of operation of forming and processing a core 1018 with the alternate, preferred form of the components illustrated in FIG. 18 will next be described with reference to the sequence as illustrated in FIGS. 19-26. Initially, turrets (similar to turrets 65 and 70 illustrated in FIG. 8) are rotated until the extending end portions of the separator sheets S1 and S2 (which are carried by holding members similar to holding members 102 in FIG. 8) are overlapped and oriented between the mandrels 1121 and 1131 (FIG. 19). The upper mandrel 1131 is at its extended, lowest position, and the lower mandrel 1121 is at its retracted, lowest position, as illustrated in FIG. 19. The guide members 1118 and 1119 are initially maintained spaced away from the mandrels 1121 and 1131 during this step in the sequence of operation.

Subsequently, as illustrated in FIG. 20, the lower mandrel 1121 and the surrounding inner sleeve 1124 are moved upwardly together a small distance until (1) the upper distal end of the lower mandrel 1121 is received within the open end of the upper inner sleeve 1134 and (2) the lower distal end of the upper mandrel 1131 is received within the open end of the lower inner sleeve 1124. Because the separator sheets and plates are still gripped by the holders (e.g., holders 102 illustrated for the embodiment shown in FIG. 9), the relatively small frictional force imposed on the separator sheets S1 and S2 by the upwardly moving lower mandrel 1121 does not cause a significant displacement or misalignment of the separator sheets between the mandrels.

Next, as illustrated in FIG. 21, the guide members 1118 and 1119 move inwardly so that the roller 1201 is forced against the mandrel 1121 and so that the roller 1221 is forced against the mandrel 1131. With the rollers biased inwardly, the mandrels 1121 and 1131 are rotated together by means of a suitable mechanism (not illustrated) which may be a well known conventional mechanism, the details of which form no part of the present invention. As the mandrels rotate, the coil 1018 is formed (FIG. 22) in the same manner as is the coil 18 described above with reference to the first embodiment of the apparatus illustrated in FIGS. 9 and 10.

After the coil 1018 has been completely formed, the rotation of the mandrels 1121 and 1131 is terminated, and the wound core 1018 is pushed up into the upper holding sleeve 1136 as illustrated in FIG. 23. To this end, the upper mandrel 1131 is retracted upwardly along with the upper inner sleeve 1134 so that the upper mandrel 1131 and upper inner sleeve 1134 maintain the same relative position but are within the upper outer sleeve 1136. Simultaneously, the lower inner sleeve 1124 is extended upwardly to engage the bottom end of the core 1018 and push the core into the upper, holding sleeve 1136.

To facilitate the movement of the core 1018 into the upper sleeve 1136, the opening at the bottom distal end of the upper sleeve 1136 is defined by a frustoconical entry surface 1137. It should be noted that when the lower inner sleeve 1124 is moved upwardly to push the core 1018, the lower mandrel 1121 is held at the highest elevation to which it had been extended in a previous step (i.e., the step as illustrated in FIG. 20).

After the core 1018 has been properly positioned within the upper, holding sleeve 1136, the guide members 1118 and 1119 move to the outwardly spaced positions as illustrated in FIG. 24, and retraction of the lower, inner sleeve 1124 is initiated so that the upper end of the lower sleeve 1124 is moved below the upper mandrel 1131.

As illustrated in FIG. 25, the retraction of the lower, inner sleeve 1124 is continued until the sleeve 1124 reaches its lowest position which is the initial position from which the operation sequence began (FIG. 19). At the same time, the lower mandrel 1121 is moved down a small amount to its lowest position as illustrated in FIG. 25, and this is the position from which the operational sequence began (FIG. 19).

The coiled core 1018 may then be discharged to a suitable receiving apparatus, or may be discharged directly into a casing 1020 as illustrated in FIG. 26. To this end, the turret on which the upper mandrel 1131 is mounted would be moved to a core dispensing position. Such a dispensing position corresponds to the dispensing position illustrated in FIG. 8 for the core 18 carried on the second turret 70 of the first embodiment apparatus. However, in this preferred, alternate embodiment illustrated in FIG. 26, the coiled core 1018 need not be transferred to an intermediate dial mechanism (e.g., such as mechanism 54 illustrated in FIG. 8).

Rather, the coiled core 1018 may be directly transferred to the casing 1020 which is carried in a turntable 1341 that is substantially identical to the turntable 341 described above with reference to the first embodiment illustrated in FIGS. 8, 12, and 13. The turntable 1341 would be positioned, however, in the location occupied by the intermediate dial 54 illustrated in FIG. 8. The turntable 1341 is rotatable about suitable shaft (not illustrated) and carries a plurality of casings 1020 in a plurality of circumferentially spaced-apart receiving cavities 1347. Each cavity 1347 is generally semi-cylindrical and opens radially outwardly to the periphery of the turntable 1341. Each battery casing 1020 is retained within a cavity 1347 of the turntable 1341 by a suitable peripheral rail 1345 (which may be similar or identical to the rail 345 illustrated for the turntable 341 in the first embodiment shown in FIG. 8).

The turntable 1341 includes a lower flange 1349 on which the bottom of each casing 1020 initially rests. The flange 1349 defines a plurality of circumferentially spaced-apart access apertures 1350. Each aperture 1350 is associated with a casing receiving cavity 1347 and is oriented generally co-axially therewith. The access apertures 1350 accommodate the upward movement of a push rod 1351 to engage the bottom of a casing 1020 and push it upwardly so that the top of the casing abuts the bottom end of the upper, holding sleeve 1136 as illustrated in FIG. 26. The turntable 1341 and casings 1020 disposed therein are arranged relative to the upper mandrels 1131 so that each incremental rotation of the turntable 1341 will correspond to an incremental rotation of the turret that carries the mandrels 1131 and so that a casing 1020 will be positioned in alignment with a mandrel 1131 for receiving a coiled core 1018 which is disposed around the mandrel 1131. The upper, inner sleeve 1134 is then extended vertically downwardly as illustrated in FIG. 26 so that the lower, distal end of the sleeve 1134 pushes the core 1018 into the casing 1020.

After the core 1018 has been pushed into the elevated casing 1020, the push rod 1351 is lowered, and the casing 1020 is re-seated on the turntable flange 1349. The turntable 1341 is then rotated to move the loaded casing 1020 toward a discharge region and to bring a new, empty casing into alignment with a new coiled core which is simultaneously being moved into position by rotation of the turret (e.g., similar to turret 70 in FIG. 8) on which the upper mandrels 1131 are mounted.

The method and apparatus of the present invention function effectively at relatively high speeds to permit an automatic assembly of a coiled core for a battery casing. The method and apparatus operate in a unique and efficient manner which has a relatively low likelihood of operational failure with a wide variety of core components having different compositions and sizes.

It will be readily observed from the foregoing detailed description of the invention and from the illustrated embodiments thereof that numerous variations and modifications may be effected without departing from the true spirit and scope of the novel concepts or principles of this invention.

What is claimed is:

1. A method for forming a core for an electrochemical cell comprising the steps of:
   (A) Juxtaposing an anode plate and a first separator sheet in an adjacent relationship restrained against relative lengthwise displacement;

(B) Juxtaposing a cathode plate and a second separator sheet in an adjacent relationship restrained against relative lengthwise displacement;

(C) overlapping an end portion of said first separator sheet with an end portion of said second separator sheet while said plates are juxtaposed relative to the respective separator sheets; and (D) restraining said overlapping separator sheet end portions against relative movement while continuously rotating said restrained overlapping end portions about an axis to wind said plates and separator sheets into a coiled core which can be inserted into an electrochemical cell casing.

2. The method in accordance with claim 1 in which an inwardly directed force is applied during step (D) to the core windings defined by the trailing portions of said plates and separator sheets so as to prevent the trailing portions of said plates and separator sheets from swinging outwardly during said rotation.

3. The method in accordance with claim 1 in which
step (A) includes arranging said anode plate and first separator sheet with an end of said first separator sheet extending beyond said anode plate
step (B) includes arranging said cathode plate and second separator sheet with an end of said second separator sheet extending beyond said cathode plate; and
step (D) includes maintaining said overlapping separator sheet end portions in face-to-face contact.

4. The method in accordance with claim 1 in which said method includes the further step, after step (D), of placing said coiled core into an electrochemical cell casing.

5. The method in accordance with claim 1 in which
step (A) includes disposing said anode plate against a first side of said first separator sheet so that an exposed side of said anode plate faces away from said first separator sheet;
step (B) includes disposing said cathode plate against a first side of said second separator sheet so that an exposed side of said cathode plate faces away from said second separator sheet; and
step (C) includes orienting said overlapping separator sheet end portions so that a portion of said first side of said first separator sheet faces a portion of said first side of said second separator sheet and so that the exposed sides of said anode and cathode plates face in opposite directions.

6. The method in accordance with claim 5 in which step (D) includes rotating said restrained overlapping end portions for at least a first full rotation in the direction so as to wind one of said separator sheets outwardly of said other separator sheet and plates.

7. The method in accordance with claim 6 in which one of said plates is arranged in one of steps (A) and (B) to have a trailing portion extending beyond said adjacent separator sheet whereby, when said plates and separator sheets are wound into a coiled core, an end portion of said one plate extends beyond said other plate and beyond both of said separator sheets to define the outermost winding of said coiled core.

8. The method in accordance with claim 1 in which
step (A) includes (1) holding said first separator sheet against a holding face of a first rotatable turret so that a leading end portion of separator sheet extends beyond said first rotatable turret gripping face and (2) holding said anode plate against said first separator sheet;

step (B) includes (1) holding said second separator sheet against a holding face of a second rotatable turret so that a leading end portion of said separator sheet extends beyond said second rotatable turret gripping face, and (2) holding said cathode plate against said second separator sheet;

step (C) includes rotating said first and second turrets in the same direction of rotation on spaced-apart, parallel rotational axes to orient said first and second separator sheet end portions in an overlapping relationship; and step (D) includes (1) clamping said overlapping separator sheet end portions in face-to-face contact between a pair of clamping members, and (2) rotating said clamping members on an axis parallel to said turret axes to pull said separator sheets from said turret holding faces along with said plates held against said separator sheets as said separator sheets and plates wind about said clamping members to form said coiled core.

9. The method in accordance with claim 8 in which said method includes the further step, after step (D), of withdrawing said clamping members from said coiled core while holding said coiled core by engaging the exterior winding of said coiled core to prevent unwinding of the core.

10. The method in accordance with claim 9 in which said step of withdrawing said clamping members includes first withdrawing one of said two clamping members and then withdrawing the other of said two clamping members.

11. The method in accordance with claim 1 in which said method includes the further steps, after step (D), of sliding said coiled core into a holding Sleeve having an open end, positioning an electrochemical cell casing to locate an open end of said casing in alignment with said sleeve open end, and pushing said coiled core from said sleeve into said casing.

12. A method for forming a core for an electrochemical cell comprising the steps of:
(A) placing an anode plate onto a first separator sheet to leave an end portion of said first separator sheet extending beyond said anode plate;
(B) placing a cathode plate onto a second separator sheet to leave an end portion of said second separator sheet extending beyond said cathode plate;
(C) restraining said anode plate and first separator sheet against relative lengthwise displacement and restraining said cathode plate and second separator sheet against relative lengthwise displacement;
(D) overlapping said end portions of said first and second separator sheets in face-to-face contact; and
(E) restraining said overlapping sheet end portions against relative movement while rotating continuously said restrained overlapping end portions about an axis adjacent at least one guide member to wind said plates and separator sheets between said axis and said guide member, whereby said plates and separator sheets are prevented by said guide member from being swung outwardly during said rotation and become wound into a coiled core which can be inserted into an electrochemical cell casing.

13. A method in accordance with claim 12 in which two of said guide members are provided on generally opposite sides of said axis for being biased toward said axis; and step (E) includes winding said coiled core so that the windings move said guide members outwardly away from said axis during said rotation as the coiled core diameter increases.

14. An apparatus for forming a core for an electrochemical cell comprising:
   (A) anode assembly means for disposing an anode plate and a first separator sheet in an adjacent relationship restrained against relative lengthwise displacement;
   (B) cathode assembly means for disposing a cathode plate and a second separator sheet in an adjacent relationship restrained against relative lengthwise displacement;
   (C) said anode and cathode assembly means being arranged for overlapping an end portion of said first separator sheet with an end portion of said second separator sheet; and
   (D) rotatable clamping means for restraining said overlapping separator sheet end portions against relative movement and for rotating said restrained overlapping end portions about an axis to wind said plates and separator sheets into a coiled core which can be inserted into an electrochemical cell casing.

15. The apparatus in accordance with claim 14 further including guide means for preventing the trailing portions of said plates and separator sheets from swinging outwardly during the rotation of said clamping means as said plates and separator sheets become wound into said coiled core.

16. The apparatus in accordance with claim 15 in which said guide means includes a guide member biased inwardly toward said axis to engage the core windings defined by the trailing portions of said plates and separator sheets to prevent them from swinging outwardly during rotation of said clamping means.

17. The apparatus in accordance with claim 14 further including means for placing said coiled core into an electrochemical cell casing.

18. The apparatus in accordance with claim 14 in which
   said anode assembly means includes means for disposing said anode plate against a first side of said first separator sheet so that an exposed side of said anode plate faces away from said first separator sheet;
   said cathode assembly means includes means for disposing said cathode plate against a first side of said second separator sheet so that an exposed side of said cathode plate faces away from said second separator sheet; and
   said anode assembly means and cathode assembly means are operative to orient said overlapping separator sheet and portions so that a portion of said first side of said first separator sheet faces a portion of said first side of said second separator sheet and so that the exposed sides of said anode and cathode plates face in opposite directions.

19. The apparatus in accordance with claim 18 in which said rotatable clamping means includes means for rotating said restrained overlapping end portions for at least a first full rotation in a direction so as to wind one of said separator sheets outwardly of said other separator sheet and plates.

20. The apparatus in accordance with claim 14 in which
   said anode assembly means includes a first rotatable turret having a holding face and means for (1) holding said first separator sheet against said holding face of said first rotatable turret so that an end portion of said separator sheet extends beyond said first rotatable turret holding face and (2) holding said anode plate against said first separator sheet;
   said cathode assembly means includes a second rotatable turret having a holding face and means for (1) holding said second separator sheet against said holding face of said second rotatable turret so that an end portion of said separator sheet extends beyond said second rotatable turret holding face, and (2) holding said cathode plate against said second separator sheet;
   said anode assembly means and said cathode assembly means together include means for rotating said first and second turrets in the same direction of rotation on spaced-apart, parallel rotational axes to orient said first and second separator sheet end portions in an overlapping relationship;
   said rotatable clamping means includes pairs of clamping members, one of said clamping members of each pair being carried with said first turret and the other of said clamping members of the pair being carried with said second turret for clamping said overlapping separator sheet end portions in face-to-face contact between the two clamping members; and
   said rotatable clamping means further includes means for rotating said clamping members on an axis parallel to said turret axes to pull said separator sheets from said turret holding faces along with said plates held against said separator sheets as said separator sheets and plates wind about said clamping members to form said coiled core.

21. The apparatus in accordance with claim 20 in which
   each said clamping member includes a reciprocative mandrel;
   said apparatus further includes a reciprocative inner sleeve around each said mandrel; and
   said apparatus further includes an outer sleeve around each said inner sleeve.

22. An apparatus for forming a core for an electrochemical cell comprising:
   a first holding means for holding a first separator sheet and an anode plate against relative lengthwise displacement
   a first separator sheet feeder means for feeding a first separator sheet to said first holding means so as to leave an end portion of said first separator sheet extending beyond said first holding means;
   an anode plate feeder means for feeding an anode plate to said first holding means to leave said end portion of said first separator sheet extending beyond said anode plate
   a second holding means for holding a second separator sheet and a cathode plate against relative lengthwise displacement;
   a second separator sheet feeder means for feeding a second separator sheet to said second holding means so as to leave an end portion of said first separator sheet extending beyond said second holding means;
   a cathode plate feeder means for feeding a cathode plate to said second holding means to leave said end portion of said second separator sheet extending beyond said cathode plate;

positioning means for positioning said first and second holding means to overlap said end portions of said first and second separator sheets in a face-to-face orientation;

guide means for being located adjacent said overlapping end portions for contacting said plates and separator sheets; and rotatable clamping means for restraining said overlapping sheet end portions against relative movement while rotating said restrained overlapping end portions about an axis adjacent said guide means to wind said plates and separator sheets between said axis and said guide means whereby said plates and separator sheets are prevented by said guide means from being swung outwardly during said rotation and become wound into a coiled core which can be inserted into an electrochemical cell casing.

23. The apparatus in accordance with claim 22 in which said guide means includes guide members provided on generally opposite sides of said axis and biasing means for biasing said guide members toward said axis against said rotatable clamping members.

24. The apparatus in accordance with claim 22 in which said positioning means includes a first turret carrying said first holding means and a second turret carrying said second holding means; and said first and second holding means each includes a holding face and vacuum means for reducing the pressure at said face whereby one of said separator sheets that is pervious to air can be held against said holding face by ambient atmospheric pressure and whereby one of said plates can be held by ambient atmospheric pressure against said one separator sheet on said holding face.

25. The apparatus in accordance with claim 22 in which each said sheet feeder means includes a rotatable vacuum drum for holding one of said sheets and carrying the sheet along an arc to one of said holding means.

26. The apparatus in accordance with claim 22 in which each said plate feeder means includes a vacuum pick up arm and means for rotating said arm along an arc to one of said holding means.

27. The apparatus in accordance with claim 22 in which said guide means includes a pair of guide members biased toward said clamping means.

28. The apparatus in accordance with claim 22 in which said clamping means includes paired clamping members; and said apparatus further includes a sleeve around a portion of one of said clamping members and means for moving said sleeve along said one clamping member to push said coiled core off of said one clamping member.

29. The apparatus in accordance with claim 22 in which said clamping means includes a plurality of reciprocative mandrels;

said apparatus further includes a reciprocative inner sleeve around each said mandrel; and said apparatus further includes an outer sleeve around each said inner sleeve.

30. The apparatus in accordance with claim 29 in which one of said outer sleeves is adapted to receive one of said coiled cores;

one of said inner sleeves has a distal end for pushing said coiled core into said one outer sleeve; and the other one of said inner sleeves has a distal end for pushing said core out of said one outer sleeve into an open ended electrochemical cell casing.

31. The apparatus in accordance with claim 30 further including a rotatable turntable having a plurality of circumferentially spaced-apart receiving cavities for each receiving one of said casings and for carrying said casing into position for receiving one of said coiled cores.

32. The apparatus in accordance with claim 22 further including a rotatable dial defining a plurality of circumferentially spaced-apart through holes for each receiving one of said coiled cores.

33. The apparatus in accordance with claim 32 further including a rotatable turntable overlapping a portion of said dial and disposed for rotation about an axis parallel to the axis of rotation of said dial, said turntable having a plurality of circumferentially spaced-apart receiving cavities for each receiving an open ended electrochemical cell casing.

34. The apparatus in accordance with claim 33 further including a plunger for pushing one of said coiled cores from one of said holes in said dial into one of said cell casings carried in said turntable.

35. The apparatus in accordance with claim 34 in which said turntable has a plurality of access apertures in the bottom of said turntable, each said aperture being aligned with and communicating with one of said turntable cavities; and said apparatus further includes a push rod disposed on one side of said turntable for being moved axially into one of said apertures to push one of said casings partly out of one of said turntable cavities and against said dial to locate an open end of the casing adjacent one of said dial through holes.

* * * * *